(12) United States Patent
Thornton

(10) Patent No.: US 11,868,848 B2
(45) Date of Patent: Jan. 9, 2024

(54) SYSTEMS AND METHODS FOR CONTROLLED QUANTUM INFORMATION PROCESSING WITH A TRANS-RADIX BASIS COMPONENT

(71) Applicant: Mitchell A. Thornton, Dallas, TX (US)

(72) Inventor: Mitchell A. Thornton, Dallas, TX (US)

( * ) Notice: Subject to any disclaimer, the term of this patent is extended or adjusted under 35 U.S.C. 154(b) by 401 days.

(21) Appl. No.: 17/230,251

(22) Filed: Apr. 14, 2021

(65) Prior Publication Data

US 2021/0365825 A1 Nov. 25, 2021

Related U.S. Application Data

(60) Provisional application No. 63/027,056, filed on May 19, 2020.

(51) Int. Cl.
*G06N 10/00* (2022.01)
*G06N 10/20* (2022.01)
*G06N 10/60* (2022.01)
*G06N 10/40* (2022.01)

(52) U.S. Cl.
CPC ............ *G06N 10/00* (2019.01); *G06N 10/20* (2022.01); *G06N 10/40* (2022.01); *G06N 10/60* (2022.01)

(58) Field of Classification Search
None
See application file for complete search history.

(56) References Cited

U.S. PATENT DOCUMENTS

| 5,301,284 | A | * | 4/1994 | Estes | G06F 15/17343 715/966 |
|---|---|---|---|---|---|
| 6,098,088 | A | | 8/2000 | He et al. | |
| 6,711,600 | B1 | | 3/2004 | Verma et al. | |
| 7,113,967 | B2 | * | 9/2006 | Cleve | G06N 10/00 257/14 |
| 8,126,953 | B2 | * | 2/2012 | Shih | G06F 17/142 708/404 |
| 9,779,359 | B2 | * | 10/2017 | Svore | B82Y 10/00 |
| 10,073,677 | B2 | * | 9/2018 | Josephsen | G06F 7/508 |
| 11,170,318 | B2 | * | 11/2021 | Ashrafi | G02F 3/00 |
| 2003/0005010 | A1 | | 1/2003 | Cleve | |
| 2007/0288542 | A1 | | 12/2007 | Shih | |
| 2013/0246495 | A1 | | 9/2013 | Svore | |

OTHER PUBLICATIONS

K.N. Smith et al., "Entangled State Preparation for Non-binary Quantum Computing," 2019 IEEE, 9 pages. (Year: 2019).*
K.N. Smith et al., "entanglement in Higher-Radix Quantum Systems," 2019 IEEE 49th Int'l Symposium on Multiple-Valued :Logic (ISMVL), IEEE Computer Society, pp. 114-119. (Year: 2019).*
Thornton, M.A., Spenner, L., Matula, D.W., and Miller, D.M., "Quantum Logic Implementations for Unary Arithmetic Operations," in proc. 38nd IEEE Int. Symp. on Multiple-Valued Logic, IEEE Computer press, pp. 202-207, 2008.

(Continued)

*Primary Examiner* — Leigh M Garbowski
(74) *Attorney, Agent, or Firm* — SPRINKLE IP LAW GROUP

(57) ABSTRACT

Systems, methods, applications and uses for trans-radix quantum information processing elements are disclosed.

20 Claims, 4 Drawing Sheets

(56) References Cited

OTHER PUBLICATIONS

Smith, K.N. and Thornton, M.A., "Higher Dimension Quantum Entanglement Generators," ACM Journal on Emerging Technologies in Computing Systems, vol. 16, No. 1, article 3, Oct. 2019, pp. 3-1:3-21.

Chrestenson, H.E. et al., "A Class of Generalized Walsh Functions," Pacific Journal of Mathematics, vol. 5, No. 1, 1955, pp. 17-31.

Zilic, Z. and Radecka, K., "The Role of Super-fast Transforms in Speeding Up Quantum Computations," Proceedings of the 32nd IEEE Int'l Symp. on Multiple-Valued Logic, IEEE Computer press, 2002, pp. 129-135.

Smith, K.N., Lafave, T.P., Macfarlane, D.L., and Thornton, M.A., "A Radix-4 Chrestenson Gate for Optical Quantum Computation," in proc. 48th IEEE Int. Symp. on Multiple-Valued Logic, IEEE Computer press, pp. 260-265, 2002.

Smith, K.N., Lafave, T.P., Macfarlane, D.L., and Thornton, M.A., "Higher-radix Chrestenson Gates for Photonic Quantum Computation," Journal of Applied Logics, vol. 5, No. 9, Dec. 2018, pp. 1781-1798.

Macfarlane, D.L., Tong, J., Fafida, C., Govindan, V., Hunt, L.R., and Panahi, I., "Extended Lattice Filters Enabled by Four-Directional Couplers," Applied Optics, vol. 43, No. 33, Nov. 2004, pp. 6124-6133, 2004.

Garcia-Escartin, J. C., Chamorro-Posada, P., "A SWAP gate for qudits," Quantum Information Processing, vol. 12, Is. 12, 2013, (arXiv:1304.4923v1 [quant-ph]), pp. 3625-3631.

Knill, E., Laflamme, R., Milburn, G.J., "A scheme for efficient quantum computation with linear optics," Nature, vol. 409, Jan. 4, 2001, pp. 46-52.

Okamoto, R., O'Brien, J.L., Hofmann, H.F., Takeuchi, S., Realization of a Knill-Laflamme-Milburn C-Not gate—a photonic quantum circuit combining effective optical nonlinearities, Proceedings Nat'l Acad. Sci., 108, 10067, 2011, (arXiv:1006.4743v1 [quant-ph], 6 pgs.

Vilenkin, N.Y., "Concerning a Class of Complete Orthogonal Systems," Dokl. Akad. Nauk SSSR, Ser. Math., Doklady Akademii Nauk SSSR, 1947, 38 pgs.

International Search Report and Written Opinion issued for International PCT Application No. PCT/US2021/027795, dated Jul. 14, 2021, 8 pages.

International Preliminary Report on Patentability issued by the International Bureau for International PCT Application No. PCT/US2021/027795, dated Dec. 1, 2022, 7 pages.

\* cited by examiner

SYSTEMS AND METHODS FOR CONTROLLED QUANTUM INFORMATION PROCESSING WITH A TRANS-RADIX BASIS COMPONENT

RELATED APPLICATIONS

This application claims a benefit of priority under 35 U.S.C. § 119 to U.S. Provisional Patent Application No. 63/027,056 filed May 19, 2020, entitled "SYSTEMS AND METHODS FOR CONTROLLED QUANTUM INFORMATION PROCESSING OPERATION WITH TRANS-RADIX BASIS COMPONENTS," by Mitchell A. Thornton, which is hereby fully incorporated by reference in its entirety.

TECHNICAL FIELD

This disclosure relates generally to quantum computing. In particular, this disclosure relates to embodiments of quantum information processing (QIP) operations suitable for use in special-purpose quantum informatics devices or in general-purpose QIP devices including, but not limited to, a quantum computer (QC). Even more specifically, this disclosure relates to embodiments of systems and methods for implementing a controlled-digit operation, including a device capable of operation with trans-radix quantum states.

BACKGROUND

Certain computational problems, such as the factoring of large numbers, cannot easily be solved using conventional computers due to the time required to complete the computation. It has, however, been shown that quantum computers can use non-classical algorithmic methods to provide efficient solutions to certain of these types of computational problems.

The fundamental unit of quantum information in a quantum computer is called a quantum bit, or qubit. Quantum computers can use a binary representation of numbers, just as conventional binary computers. In addition, quantum systems can also make us of use multi-valued logic and data, in which case, the atomic quantum datum is referred to as a "qudit". An individual qubit or qudit datum can be physically represented by the state of a quantum system. However, in a quantum system, the datum can be considered to be in more than one of the possible states at any single given time. Thus, in the case of a qubit, the datum can be in a state that represents both a zero and a one at the same time. This state is referred to as superposition. Quantum superpositions of this kind are fundamentally different from classical data representations, even when classical probabilities are taken into account. It is only when a quantum datum is observed that its value "collapses" into a well-defined, single state. This "collapse" occurs due to an intentional observation or measurement or it can occur due to environmental influences, referred to as decoherence.

Thus, while bits in the classical computing model always have a well-defined value (e.g., 0 or 1), qubits in superposition have some simultaneous probability of being in both of the two states representing 0 and 1. It is customary to represent the general state of a quantum system by $|\psi\rangle$, and let $|0\rangle$ and $|1\rangle$ represent the quantum states corresponding to the values 0 and 1, respectively. Quantum mechanics allows superpositions of these two states, given by $$|\psi\rangle = \alpha|0\rangle + \beta|1\rangle$$

where $\alpha$ and $\beta$ are complex numbers. In this case, the probability of observing the system in the state $|0\rangle$ is equal to $\alpha^2$ the probability of the state $|1\rangle$ is $\beta^2$.

Quantum computers may utilize physical particles to represent or implement these qubits or qudits. One example is the spin of an electron, wherein the up or down spin can correspond to a 0, a 1, or a superposition of states in which it is both up and down at the same time. Performing a calculation using the electron may essentially perform the operation simultaneously for both a 0 and a 1. Similarly, in the photonic approach to quantum computing, a "0" may be represented by the possibility of observing a single photon in a given path, whereas the potential for observing the same photon in a different path may represent a "1".

For example, consider a single photon passing through an interferometer with two paths, with phase shifts $\varphi_1$ and $\varphi_2$ inserted in the two paths respectively. A beam splitter gives a 50% probability that the photon will travel in one path or the other. If a measurement is made to determine where the photon is located, it will be found in only one of the two paths. But if no such measurement is made, a single photon can somehow experience both phase shifts $\varphi_1$ and $\varphi_2$ simultaneously. This suggests that in some sense a photon must be located in both paths simultaneously if no measurement is made to determine its position. This effect can be experimentally verified by observing the interference pattern resulting from the interaction of the two paths when only a single photon is allowed to transit through the device at a given time. Of course, if there are more than a single pair of possible photonic paths, then the resulting system can be said to represent a qudit.

It is thus well known that controlled qudit operations are required to enable certain particular QIP processing tasks. As an example, many quantum communications protocols and processes require the generation of two entangled qudits. In this case, a controlled qudit operation is commonly employed to serve as the entangling operator in a QIP system comprising an entanglement generator. For at least this reason, there is motivation to devise efficient methods to realize controlled qudit operations that are optimized (e.g., with respect to some desirable physical property).

SUMMARY

To address this need, among others, attention is directed to embodiments of systems and methods for implementing a controlled-digit operation, including a device capable of operation with trans-radix quantum states. Specifically, embodiments as disclosed herein may provide a radix-2 quantum operation utilizing a trans-radix quantum circuit comprising one or more radix-r circuit elements where r>2. Embodiments of such a quantum circuit may also include one more radix-2 circuit elements, wherein the input or output ports of the one or more radix-r quantum circuit elements are utilized to support the input and output of radix-2 qubit transmission channels.

In particular embodiments may utilize a radix-4 Chrestenson gate, $C_4$ in a trans-radix fashion. In particular, embodiments may utilize two qubits (e.g., photons) with the Chrestenson gate, $C_4$. Each qubit (e.g., photon) may be present at only two associated ports of the Chrestenson gate, $C_4$. In particular, a first qubit may be provided at an associated waveguide of a first or second port of the Chrestenson gate, $C_4$, such that the first qubit is in a basis state on the waveguide of the first port or on the waveguide of the second port or, the first qubit is superimposed on both the waveguide of the first port and the waveguide of the second port. Similarly, a second qubit may be provided at an associated third and fourth port of the Chrestenson gate, $C_4$ such that the second qubit is in a basis state on the waveguide of the third port or on the waveguide of the fourth port or, the second qubit is superimposed on both the waveguide of the first port and the waveguide of the second port. It may be desirable in many embodiments that this presentation of the first and second qubits at their respective ports be time aligned.

Accordingly, based on the interaction of the first and second qubit in the radix-4 Chrestenson gate, $C_4$ the first qubit may emerge in a basis state on the waveguide of the first port or the waveguide of the second port, or superimposed on both waveguides from both the first and second ports of the Chrestenson gate, $C_4$, while the second qubit may emerge in a basis state on the waveguide from the third port or the waveguide of the fourth port, or superimposed on both waveguides from both the third and fourth ports of the Chrestenson gate, $C_4$. Embodiments of such a trans-radix Chrestenson gate, $C_4$ in may have up to a 100% success rate in achieving interaction (e.g. entanglement) of the qubits utilized with such a trans-radix Chrestenson gate.

As may be understood, embodiments of such a trans-radix Chrestenson gate, $C_4$ (e.g., embodiments utilizing QIP circuit element 550 in a trans-radix configuration) may have up to a 100% success rate in achieving interaction (e.g. entanglement) of the two qubits utilized with such a trans-radix Chrestenson gate. Accordingly, because such a trans-radix Chrestenson gate $C_4$ may be utilized as a type of controlled quantum circuit based on at least two qubits, such a trans-radix Chrestenson gate $C_4$ can be usefully employed in embodiments of other (e.g., standard) controlled quantum circuits. For example, embodiments of a trans-radix Chrestenson gate $C_4$ gate may be used to implement embodiments of a reliable controlled-S gate quantum circuit, embodiments of a reliable controlled-Z quantum circuit, embodiments of a reliable controlled-X quantum circuit, or more generally to implement reliable embodiments of quantum circuits where entanglement or interaction of qubits is desired.

Moreover, as will be understood, a controlled-S gate (e.g., or a controlled-X gate) may be a subset of all possible quantum operations in the binary domain. Accordingly, almost any quantum circuit desired may be constructed in a reliable fashion using embodiments of a trans-radix Chrestenson gate, $C_4$, embodiments of the controlled-S gate, embodiments of the controlled-S gate or controlled-X gate as disclosed herein. Thus, embodiments herein may serve as a foundational change to the reliability of quantum circuits and quantum computing more generally.

Thus, embodiments of the systems and methods disclosed may also include one or more radix-4 QIP elements with a characteristic transformation matrix in the form of a Chrestenson transform matrix, one or more radix-2 single qubit QIP elements with a characteristic transformation matrix in the form of a unitary transform matrices, and adapted to operate as a radix-2 controlled-qubit circuit element.

Certain embodiments of the systems and methods may include one or more radix-4 QIP elements with a characteristic transformation matrix in the form of a Chrestenson transform matrix, one or more radix-2 single qubit QIP elements with a characteristic transformation matrix in the form of a Hadamard transform matrix, and be adapted to operate as a radix-2 controlled-S QIP circuit element.

Other embodiments of the systems and methods may include one or more radix-4 QIP elements with a characteristic transformation matrix in the form of a Chrestenson transform matrix, one or more radix-2 single qubit QIP elements with a characteristic transformation matrix in the form of a Hadamard transform matrix, and be adapted to operate as a radix-2 controlled-Z QIP circuit element.

Some embodiments of the systems and methods may include one or more radix-4 QIP elements with a characteristic transformation matrix in the form of a Chrestenson transform matrix, one or more radix-2 single qubit QIP elements with a characteristic transformation matrix in the form of a Hadamard transform matrix, and be adapted to operate as a radix-2 controlled-X QIP circuit element.

In particular embodiments, a quantum Chrestenson gate may be implemented using photonics.

For example, some embodiments may comprise an optical four-port directional coupler that is configured to operate as a trans-radix two-qubit QIP circuit element.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

Figure 1:
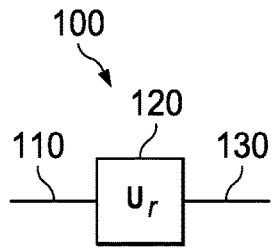
FIG. 1 illustrates, in QIP circuit form, the general diagram of a radix-r single qubit operation with a generalized transformation matrix Ur.

The disclosure and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before discussing embodiments in detail, it may helpful to give a general overview of certain aspects pertaining to embodiments. As may be recalled from the above discussion, quantum information processing (QIP) comprises methods and systems that use quantum mechanical or quantum electrodynamics physical phenomena to represent and process data. Observable characteristics of the microscopic, mesoscopic, or quasi-particles, hereafter referred to as "host particles," represent or encode data values to be processed. Host particle wave functions evolve in accordance with the postulates of quantum mechanics or electrodynamics. Within the QIP framework, a specified set of host particle wave function evolutions, in time or space, serve as a computation. In one implementation of a quantum computer (QC), a given distinct sequence of operations serves as a QC program that accordingly executes by way of the quantum mechanical evolutions of the host particle wave functions. In this QC instance, a user may specify a particular sequence of operations during the act of programming the QC. In one type of special-purpose QIP device, a finite subset of distinct sequences of operations specifies the special-purpose functionality of the QIP device.

The quantum state of a host particle is understood to evolve in accordance with well-known dynamic relationships described by the Schrödinger or Liouville-von Neumann wave equations. A specific evolution is governed by one of many different possible solutions of these equations. A specific solution of the wave equation is in the form of a unitary matrix that results and is in the form of a complex exponential of a Hamiltonian operator. A particular Hamiltonian operator therefore specifies a particular and distinct QIP operation. Mathematically, the unitary operator is applied to the initial condition of the wave function resulting in the evolved form due to the particular Hamiltonian upon which the unitary operator depends.

A quasi-particle may be implemented in the form of an integrated microwave electronic circuit. The host quasi-particle can evolve in time from an initial state to a different state by way of the application of a microwave pulse of energy applied to the circuit. The form of the circuit and the form of the pulse in terms of its frequency, phase, and amplitude specify a particular unitary matrix that serves as a QIP operation. A collection of different unitary matrices thereby accordingly represents a collection of information processing operations that can be applied to the quasi-particle or integrated microwave electronic circuit.

Within the framework of QIP, a collection of host particles abstractly represents a corresponding collection of quantum digits or "qudits." It is typically the case that a collection of qudits is characterized by some pre-established order thus enabling the said collection to be considered as a qudit register. The content of the qudit register represents a composite value. The said composite value is thus an abstracted view of the overall physical quantum state or wave function of the QIP system. The qudit register value can change when the QIP system quantum state evolves due to the application of an operation. Thus, a specific QIP system computation is specified by a specific unitary matrix that can transform the qudit register value.

QIP systems are usually implemented based upon a pre-designated, fixed, non-zero, integer value r referred to as the system base or radix wherein the said radix r constrains the dimensions of the quantum state vector or density matrix representing the wave function of each host particle. The inherent discrete nature of quantum mechanical or quantum electrodynamical observables is controlled such that each host particle wave function is not allowed to require representation with a vector or matrix whose dimensions are greater than r or r×r respectively. One implementation of a QIP utilizes host particle observables that can only occupy the two lowest quantum states thus resulting in a binary system and wherein each host particle represents a quantum bit or "qubit."

With respect to QIP systems that are implemented using n distinct host particles whose observables are limited to r dimensions only, operations of the said QIP system can be abstractly represented by specific unitary matrices with dimension $r^n \times r^n$. Alternatively, the said QIP system can be considered as comprising a register of n individual and distinct radix-r qudits. An operation performed on a single radix-r qudit, wherein the said single qudit is abstractly represented as an r-dimensional vector or pure state, would then be represented by a corresponding r×r unitary matrix.

The application of the operation causes the single qudit to evolve to a new state that is representable as the direct product of the said r×r unitary matrix with the initial state of the qudit represented by a corresponding r-dimensional vector.

As may be understood by those skilled in the art, any arbitrary radix-r pure quantum state $|\Psi_r\rangle$ can be expressed mathematically as a linear combination of the set of computational basis vectors scaled by the probability amplitudes, $a_i \in \mathbb{C}$, where $\mathbb{C}$ represents the field of complex values, as $$|\Psi_r\rangle = a_0|0\rangle + a_1|1\rangle + \ldots + a_{r-2}|r-2\rangle + a_{r-1}|r-1\rangle$$

where $|\Psi_r\rangle$ is a pure state. As is additionally well known, the probability amplitudes of the pure state must likewise satisfy $$|a_0|^2 + |a_1|^2 + \ldots + |a_{r-2}|^2 + |a_{r-1}|^2 = 1.$$

Based upon this representation of a pure state, the set of computational basis vectors are the set of r orthonormal vectors denoted as $|k\rangle$ for k=0 to k=r-1 wherein the corresponding probability amplitudes of each basis vector is $a_i = 0$ for i≠k and $a_k = 1$. Therefore, the computational basis states are defined as the set $\{|0\rangle, |1\rangle, \ldots, |r-2\rangle, |r-1\rangle\}$.

Likewise, a unitary evolution matrix, $U_r$, applied to a pure quantum state $|\Psi_r\rangle$ can be considered as comprising a set of column vectors that represent all possible evolved states corresponding to an initial state that is equivalent to one of the r distinct computational basis states. The leftmost column vector of Ur, corresponds to the evolved state of $|0\rangle$ and the rightmost column vector corresponds to the evolved state of basis vector $|r-1\rangle$.

From the viewpoint of the mathematical model of qudit evolutions, an operation represented as a unitary matrix can cause one or more qudit values to change in the register. One form of operation, known as a "controlled qudit operation" depends upon the initial or current state of two qudits in the register. It will be noted here that these operations can be extended from the binary (or radix-2) qubit case to the qudit case, so more generally these quantum operands can be referred to as either qubits (which are specifically radix-2 encoded and are used for this particular case) or qudits (which can be used to represent the more general case). Thus, while in this particular case an operation on a qubit is specifically referred to, this and subsequent operations illustrated herein can also all be extended more generally to apply to qudits.

Here, n=2 and the corresponding unitary transformation matrix has dimension $r^2 \times r^2$. The first of these two qubits is designated as the "control qubit" and the second of the two qubits is designated as the "target qubit." A controlled qubit operation causes the target qubit to conditionally evolve dependent upon the value or current state of the control qubit. More specifically, controlled-qubit operations refer to the set of two-qubit operations wherein the first, or control, qubit indicates a specific and distinct form of transformation that is applied to the second target qubit wherein the distinct form of target qubit transformation differs based on the state of the first, or control, qubit. Thus, the two-qubit controlled-qubit operation results in a conditional evolution of the target qubit. Complete families of controlled qubit operations and their application in synthesizing QIP systems are described in [TS+:08] referenced below.

More generally, a controlled qudit operation is defined by specifying a particular basis vector value referred to here as the "activation value" that, when satisfied by the control qudit, causes a single qudit transformation operator to be applied to the target qudit. The target qudit only undergoes the specified single qudit transformation when the control qudit satisfies the specified activation value criterion. If the control qudit does not satisfy the activation value criterion, then the target qudit remains unchanged with its evolution being equivalent to that of an identity matrix operator. Because the control qudit can possibly be in a state of quantum superposition, the said control qudit can likewise have a non-zero probability amplitude for the activation value component of its corresponding wave function. In this case, the controlled qudit operator can serve as an entangling gate under appropriate conditions resulting in the composite quantum state of the target and control qudits to evolve into a condition of quantum entanglement [ST:19].

An embodiment of a controlled qubit operation involves a first control qubit and a second different and distinct target qubit wherein the state of the control qubit governs which of two distinct single qubit transformations are applied to the target qubit. In one particular embodiment of a controlled qubit operation, referred to as a "controlled-S" operation, the control qubit causes the target qubit to either undergo a relative phase shift of 90 degrees among its two wave function components, or to remain unchanged. In this embodiment, the control-S unitary matrix is of dimension $2^2 \times 2^2 = 4 \times 4$. The target qubit either undergoes a single qubit evolution represented by a 2×2 unitary matrix S or, alternatively, the target qubit remains unchanged depending upon the state of the control qubit and the specified activation basis value. It is usually the case that controlled qubit operators assume an activation value of $|1\rangle$ for the control qubit where $|1\rangle$ is a member of the computational basis set. For QIP systems where r>2, it is the usual practice that a control qudit has a specified activation basis value from the set $\{|0\rangle, |1\rangle, \ldots, |r-2\rangle, |r-1\rangle\}$ for a particular controlled qudit operation where $\{|0\rangle, |1\rangle, \ldots, |r-2\rangle, |r-1\rangle\}$ is a generalization of the computational basis in an r-dimensional vector space.

Thus, controlled qudit operations are required to enable certain particular QIP processing tasks. As an example, many quantum communications protocols and processes require the generation of two entangled qudits. In this case, a controlled qudit operation is commonly employed to serve as the entangling operator in a QIP system comprising an entanglement generator. For this reason, among others, there is motivation to devise efficient methods to realize controlled qudit operations that are optimized with respect to some desirable physical property.

To elaborate in more detail, in many cases current QIP circuits (also just referred to herein as quantum circuits) may have controlled operators (e.g., a quantum circuit that may be based on, or perform, entanglement of qudits). However, in many instances these controlled operations may function to actually entangle such qudits (or otherwise allow such qudits to interact) only a fraction of the time (e.g., 25% or the like). Such failures may result, for example, at least partially from the information carrier used for such qudits. For example, when photons are utilized as the information carriers, it may be extremely difficult to get photons to interact. Thus, in operations where such entanglement fails (e.g., 75% of the time) the entire quantum operation may fail. Such high rates of failure (both of the entanglement operation and the resulting failure of the quantum circuit generally) serve as a massive impediment to efficient QIP. Thus, there is significant motivation to realize such controlled qudit operations that have higher rates of success, including the entanglement of qudits and the controlled qudit operations that depend on such entanglement operations.

Some additional context may also prove useful. Turning first then to FIG. 1, a single qudit operation in the form of a QIP circuit 100 is depicted. The QIP circuit is depicted with a horizontal line 110 that represents a qudit prior to its evolution due to a QIP circuit gate 120. The progression of the horizontal line from left to right indicates the evolution of the qudit in time or space and qudit 110 retains a constant state along the progression of line 110. QIP gate 120 intersects the horizontal line representing the qudit and represents a quantum state evolution that is applied to the qudit causing it to evolve to a new state. Furthermore, the symbol Ur that annotates box 110 represents the particular matrix operator that mathematically models the qudit evolution and thus provides the specific form of evolution as a transformation matrix. The subscript r denotes the radix or dimension of the vectors and matrices representing the wave functions and transformations. QIP circuit 100 is depicted with a horizontal line 130 that represents a qudit after it has evolved due to QIP gate 120 and remains in a constant evolved state along the progression of line 130.

Mathematically, radix-r qudits are typically represented as either pure state wave functions in the form of a column vector or ket of dimension r, or alternatively, the quantum state can be represented as an r×r density matrix. These two alternative forms of qudit representation are denoted as $|\Psi_r\rangle$ and $\rho_r$, respectively. For pure states, the relationship between these two forms of quantum state representation is $\rho_r = |\Psi_r\rangle\langle\Psi_r|$. More generally, when the quantum state is a mixed state comprised of the k-member ensemble $\{p_i, |\Psi_{ri}\rangle\}$, with $p_i$ denoting the objective probability that state $|\Psi_{ri}\rangle$ is present in the mixed state $\rho_r$, it is represented as the density matrix formed as $$\rho_r = \sum_{i=1}^{k} p_i |\Psi_{ri}\rangle\langle\Psi_{ri}|.$$

The matrix operator Ur annotating QIP gate 120 is likewise represented as an r×r transformation matrix that, when multiplied with the pure state $|\Psi_r\rangle$ yields the evolved state. From a physical implementation point of view, the radix r usually represents the lower r discrete quantum levels in which the wave function is confined for a given QIP system implementation.

Using these mathematical models, the time evolution of a single radix-r qudit with respect to an operator described by the r×r unitary matrix $U_r$ is calculated as, $$|\Psi_r(t_1)\rangle = U_r |\Psi_r(t_0)\rangle$$

or, in terms of the density matrix representation, as, $$\rho_r(t_1) = U_r \rho_r(t_0) U_r^\dagger.$$

Although a pure state wave function can be described with either a column vector or a density matrix, the column vector formulation shall be utilized herein without loss of generality.

Within these single qudit time evolutions, time to represents the state of the qudit before the operator represented by $U_r$ is applied and time $t_1$ represents the time after the qudit has evolved with respect to $U_r$. For example, time $t_0$ represents the state of the qudit on line 110 and time $t_1$ represents the state of the qudit on line 130 after the application of QIP gate 120. In general, the unitary transformation matrix $U_r = [u_{ij}]_{r \times r}$ is of dimension r×r and has components $u_{ij} \in \mathbb{C}$, where $\mathbb{C}$ represents the field of complex numbers.

As a representative illustration of an r=3 qudit represented as a pure state ket $$|\Psi_3(t_0)\rangle = \begin{bmatrix} a_0 \\ a_1 \\ a_2 \end{bmatrix},$$

and a general operator, $U_3$, specified as $$U_3 = \begin{bmatrix} u_{00} & u_{01} & u_{02} \\ u_{10} & u_{11} & u_{12} \\ u_{20} & u_{21} & u_{22} \end{bmatrix},$$

the resulting time evolution of $|\Psi_3\rangle$ is calculated as $$|\Psi_3(t_1)\rangle = U_3 |\Psi_3(t_0)\rangle = \begin{bmatrix} u_{00} & u_{01} & u_{02} \\ u_{10} & u_{11} & u_{12} \\ u_{20} & u_{21} & u_{22} \end{bmatrix} \begin{bmatrix} a_0 \\ a_1 \\ a_2 \end{bmatrix} = \begin{bmatrix} u_{00}a_0 + u_{01}a_1 + u_{02}a_2 \\ u_{10}a_0 + u_{11}a_1 + u_{12}a_2 \\ u_{20}a_0 + u_{21}a_1 + u_{22}a_2 \end{bmatrix}.$$

Figure 2:
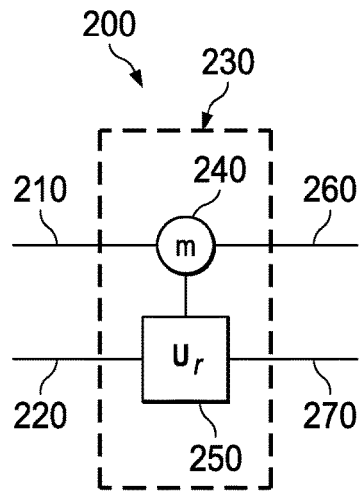
FIG. 2 illustrates, in QIP circuit form, the general diagram of a radix-r controlled qubit operation with a generalized target qubit transformation matrix Ur.

FIG. 2 depicts a controlled qudit operation in the form of a QIP circuit 200. The QIP circuit 200 is depicted with horizontal lines 210 and 220 representing separate and distinct qudits prior to their evolution due to any QIP gate. The progression of the horizontal lines 210 and 220 from left to right indicate the evolution of the qudit in time or space. The vertical symbol 230 indicates the presence of an operator. In FIG. 2, a single, two-qudit operator is depicted as the vertical line and connected QIP gate 250 labeled "$U_r$." The presence of the circle 240 annotated with a value m that intersects the topmost qudit line 210 and the vertical line indicates that the topmost qudit 210 is a control qudit. The value m that annotates circle 240 indicates the activation basis value as $|m\rangle$. The QIP gate 250 labeled "Ur" that intersects the bottommost qudit 220 and the vertical line indicates that the bottommost qudit 220 is the target qudit. Lines 260 and 270 represent the qudits after they have evolved due to QIP circuit gate 230. Line 260 represents the state of the control qudit that remains unchanged from its form prior to the application of QIP circuit gate 230 and is thus has a state identical to that of line 210. Line 270 represents the state of the target qudit (e.g. line 220) after it has evolved due to QIP circuit gate 230.

The symbol $U_r$ annotating QIP gate 250 represents the operation that describes the target qudit 220 evolution when the current state of control qudit 210 satisfies activation basis value of $|m\rangle$ as specified by the annotation m in circle 240. When the control qubit 210 does not satisfy the activation basis value criterion as specified by the annotation m in circle 240, the target qudit 220 remains unchanged and is not affected by the $U_r$ operator implemented by QIP gate 250 and evolves as if the single qudit operator was the r×r identity matrix, $I_r$.

The qudits represented by lines 210, 220, 260, and 270 in FIG. 2 may also be mathematically represented as evolving r-dimensional quantum state kets, or r×r density matrices. Lines 210 and 260 represent the same host particle serving as the control qudit before and after evolution due to QIP circuit gate 230. Likewise, lines 220 and 270 represent the same host particle serving as the target qudit before and after evolution due to QIP circuit gate 230. Since the progression of lines 210, 220, 260, and 270 from left to right indicate the evolution of the qudits in time or space, each point on lines 210, 220, 260, and 270 can be interpreted as representing a distinct instance of a temporal or spatial evolution of the corresponding quantum state vector or density matrix. The single qudit evolution operator denoted as Ur implemented by QIP gate 250 is mathematically represented as an r×r unitary matrix that is conditionally applied to qudit 220 depending upon the activation value of qudit 210 whose general form is $$U_r = \begin{bmatrix} u_{00} & u_{01} & u_{02} & \ldots & u_{0(r-1)} \\ u_{10} & u_{11} & u_{12} & \ldots & u_{1(r-1)} \\ u_{20} & u_{21} & u_{22} & \ldots & u_{2(r-1)} \\ \vdots & \vdots & \vdots & \ddots & \vdots \\ u_{(r-1)0} & u_{(r-1)1} & u_{(r-1)2} & \ldots & u_{(r-1)(r-1)} \end{bmatrix}.$$

The more common representation of the controlled-qudit QIP operation implemented by QIP circuit gate 230 is to represent the overall two-qudit unitary matrix as an $r^2 \times r^2$ unitary matrix denoted as $C_U$. The form of $C_U$ can be expressed in quadrants of submatrices where $0_r$ is the r×r null matrix whose components are all zero-valued and $D_{rk}$ are r×r single qudit operator submatrices along the diagonal of the controlled qudit operator matrix. When k=m, the diagonal submatrix $D_{rm}$ is equivalent to the single qudit operator matrix $U_r$ that causes the target qudit quantum state to evolve to a new and different distinct state. Otherwise, when k≠m, each diagonal r×r submatrix is equivalent to the r×r identity matrix, $I_r$. Expressing $C_U$ in the form of quadrants of submatrices is $$C_U = \begin{bmatrix} D_{r0} & 0_r & \ldots & \ldots & \ldots & 0_r & 0_r \\ 0_r & D_{r1} & 0_r & \ldots & \ldots & 0_r & 0_r \\ 0_r & 0_r & \ddots & 0_r & \ldots & \ldots & \vdots \\ \vdots & \vdots & 0_r & D_{rm} & 0_r & \ldots & \vdots \\ \vdots & \vdots & \vdots & 0_r & \ddots & 0_r & \vdots \\ 0_r & 0_r & \vdots & \vdots & 0_r & D_{r(r-2)} & 0_r \\ 0_r & 0_r & \ldots & \ldots & \ldots & 0_r & D_{r(r-1)} \end{bmatrix},$$

$$D_{rk} = \begin{cases} U_r, & k = m \\ I_r, & k \neq m \end{cases}.$$

Figure 3:
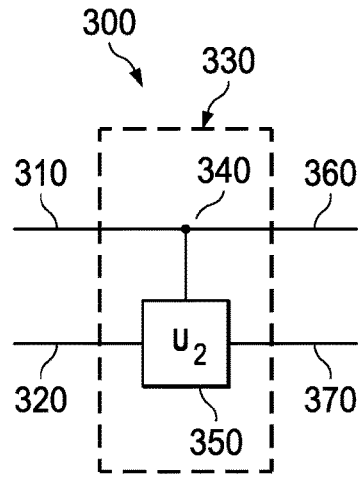
FIG. 3 illustrates, in QIP circuit form, the diagram of a radix-2 controlled qubit operation with a generalized target qubit transformation matrix U. The resulting overall transformation matrix for this controlled qubit operator is denoted Cu.

FIG. 3 depicts a general case of a controlled qubit operation in the form of a QIP circuit 300. The QIP circuit 300 is depicted with horizontal lines, 310, 320, 360, and 370 representing separate and distinct qubits prior to and after evolution due to QIP circuit element 350. The progression of the horizontal lines 310 and 320 from left to right indicate the evolution of the qubit in time or space. QIP circuit element 330 implements a QIP operation. In FIG. 3, a single, two-qubit operator is depicted as the vertical line and QIP gate 350 annotated with "$U_2$." The presence of the black dot 340 that intersects the topmost qubit line 310 and the vertical line of QIP circuit element 330 indicates that the topmost qubit 310 is a control qubit. As is the convention for QIP systems utilizing a binary, r=2, basis, the activation basis value of the control qubit is assumed to be $|1\rangle$. The QIP gate 350 annotated with "$U_2$" that intersects the bottommost qubit indicated as line 320 and 370 and QIP gate 350 of QIP circuit element 330 indicates that the bottommost qubit represented by lines 320 and 370 is the target qubit. Thus, when the target qubit 310 satisfies the activation value, $|1\rangle$, the single qubit operator $U_2$ implemented by QIP gate 350 describes the evolution of the target qubit as line 370. When the control qubit 310 does not satisfy the activation basis value of $|1\rangle$, the target qubit (lines 320, 370) evolves with respect to the 2×2 identity operator $I_2$ and its quantum state represented by line 370 remains identical to that as represented by line 320.

The operation of the controlled qubit QIP circuit 300 can be mathematically described as the application of the 4×4 operator $C_U$ where $$C_u = \begin{bmatrix} I_2 & 0_2 \\ \hline 0_2 & U_2 \end{bmatrix} = \begin{bmatrix} 1 & 0 & 0 & 0 \\ 0 & 1 & 0 & 0 \\ 0 & 0 & u_{00} & u_{01} \\ 0 & 0 & u_{10} & u_{11} \end{bmatrix}.$$

Figure 4:
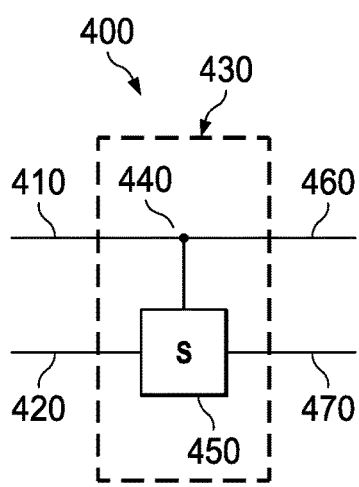
FIG. 4 illustrates, in QIP circuit form, the diagram of a radix-2 controlled qubit operation with a specific target qubit transformation matrix S. The resulting overall transformation matrix for this controlled qubit operator is denoted $C_S$.

FIG. 4 depicts a specific case of a controlled qubit operation in the form of a QIP circuit 400 known as a "controlled phase gate" or a "controlled s gate." The QIP circuit 400 is depicted with horizontal lines 410, 420, 460, and 470 representing two separate and distinct host particles serving as qubits. Again, the progression of the horizontal lines 410, 420, 460, and 470 from left to right indicate the evolution of the qubits in time or space. Lines 410 and 460 represent the same host particle serving as the control qudit before and after evolution due to QIP circuit element 430. Likewise, lines 420 and 470 represent the same host particle serving as the target qudit before and after evolution due to QIP circuit element 430. QIP circuit element 430 is referred to as a "phase gate." In FIG. 4, a single, two-qubit operator is depicted as the vertical line and connected gate 450 annotated with "S." The presence of the black dot 440 that intersects the topmost qubit line 410 and the vertical line of operator element 430 indicates that the topmost qubit 410 is a control qubit. As is the convention for QIP systems utilizing a binary, r=2, basis, the activation basis value of the control qubit is assumed to be $|1\rangle$. The QIP gate 450 annotated with "S" that intersects the bottommost qubit, represented by lines 420 and 470, and indicates that the bottommost qubit is the target qubit.

Thus, when the control qubit 410 satisfies the activation value, $|1\rangle$, the single qubit operator implemented by gate 450 and annotated with S describes the evolution of the target qubit 420 in accordance with the phase gate transformation matrix S resulting in a different state represented by line 470. When the control qubit 410 does not satisfy the activation basis value of $|1\rangle$, the target qubit evolves with respect to the 2×2 identity operator $I_2$ and its quantum state as represented by line 470 remains unchanged from its original state represented by line 420.

The operation of the controlled qubit QIP circuit 400 can be mathematically described as the application of the 4×4 matrix operator denoted as $C_S$ where $$C_s = \left[\begin{array}{c|c} I_2 & 0_2 \\ \hline 0_2 & S \end{array}\right] = \begin{bmatrix} 1 & 0 & 0 & 0 \\ 0 & 1 & 0 & 0 \\ 0 & 0 & 1 & 1 \\ 0 & 0 & 1 & i \end{bmatrix}.$$

The value i appearing in the two qubit transformation matrix $C_S$ is the imaginary value that satisfies $i^2=-1$. The action of the single qubit phase operator S causes a 90 degree relative phase shift to occur between the computational basis components of the target qubit 420 when the control qubit 410 satisfies the activation basis criteria.

Figure 5A:
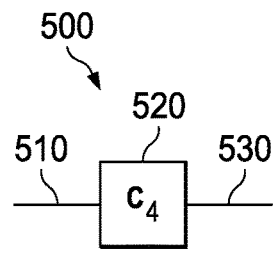
FIG. 5a illustrates, in QIP circuit form, the diagram of a radix-4 single qudit operation referred to as the Chrestenson gate and denoted as $C_4$.

FIG. 5a depicts a specific case of a single radix-4 qudit operation in the form of a QIP circuit 500 known as a "radix-4 Chrestenson gate." QIP circuit 500 is depicted with a horizontal lines 510 and 530 representing a single radix-4 qudit prior to and after evolution due to the QIP circuit operator implemented by gate 520. The progression of horizontal lines 510 and 530 from left to right indicates the evolution of the radix-4 qubit in time or space. Gate 520 represents a single qudit operator that causes the qudit to evolve in a specific manner that is accordance with a transformation matrix denoted by $C_4$ as annotated inside gate 520. The radix-4 Chrestenson operator $C_4$ is described mathematically as $$C_4 = \frac{1}{\sqrt{4}}\begin{bmatrix} 1 & 1 & 1 & 1 \\ 1 & i & -1 & -i \\ 1 & -1 & 1 & -1 \\ 1 & -i & -1 & i \end{bmatrix}.$$

In general, Chrestenson transformation matrices can be formulated for any radix, r>2. The general form for a radix-r Chrestenson transformation matrix, $C_r$, where r>1 is an r×r unitary matrix where each matrix component is one of the r distinct $r^{th}$ roots of unity raised to each integer power in the range [0, r−1] denoted as $(\omega_p)^k$. expressed as $$(\omega_p)^k = e^{i\frac{2\pi k}{p}}.$$

The explicit matrix form of the radix-r Chrestenson operator $C_r$, is described mathematically as $$C_r = \frac{1}{\sqrt{r}}\begin{bmatrix} \omega_0^0 & \omega_0^1 & \cdots & \omega_0^{r-2} & \omega_0^{r-1} \\ \omega_1^0 & \omega_1^1 & \cdots & \omega_1^{r-2} & \omega_1^{r-1} \\ \vdots & \vdots & \ddots & \vdots & \vdots \\ \omega_{r-2}^0 & \omega_{r-2}^1 & \cdots & \omega_{r-2}^{r-2} & \omega_{r-2}^{r-1} \\ \omega_{r-1}^0 & \omega_{r-1}^1 & \cdots & \omega_{r-1}^{r-2} & \omega_{r-1}^{r-1} \end{bmatrix}.$$

The $C_4$ single qudit operator implemented by gate 520 is a special case of the general radix-r Chrestenson gate $C_r$ where the parameters p and k in the expression for the distinct $r^{th}$ roots of unity raised to integer powers are each restricted to have values from the set {0, 1, 2, 3}. When the Chrestenson transformation matrix is formulated for the binary case, r=2, an operator that is well known to those skilled in the art referred to as the Hadamard transformation matrix, H, results given as $$H = \frac{1}{\sqrt{2}}\begin{bmatrix} 1 & 1 \\ 1 & -1 \end{bmatrix}.$$

Single qudit Chrestenson operators are characterized by transformation matrices that are derived as discrete Fourier transforms over Abelian groups. The general theory of the discrete Fourier transform over Abelian groups is described in references [Ch:55][Vi:47]. Many useful applications of Chrestenson transforms in QIP systems have been demonstrated [ZK:02] [ST:19].

Examples of physical implementations of the radix-4 Chrestenson transform are described in [SL+:18a][SL+:18b]. These physical implementations utilize photons as host particles with their spatial position among a designated group of waveguides or in free space serving as the information carrying observable. Other implementations such as those superconducting qubits are possible and are contemplated herein.

The $C_4$ implementation in a quantum photonic integrated circuit (QPIC) utilizes four waveguides as the transmission medium for a single photon. Each of the four waveguides represents one of the four computational basis vectors, {$|0\rangle$, $|1\rangle$, $|2\rangle$, $|3\rangle$}, and is referred to as a "basis waveguide." Relating this physical implementation to FIG. 5a would then equate the horizontal lines 510 and 530 to the photon wave function at some time or spatial position among the group of four basis waveguides. Likewise, when a host particle such as a photon, in such a system is in a state of equal superposition, one of its possible corresponding perfectly superimposed wave functions is expressed as $$|\Psi_4\rangle = \frac{|0\rangle + |1\rangle + |2\rangle + |3\rangle}{\sqrt{4}}.$$

A projective measurement with respect to the photon's location observable, while in a state of perfect superposition, indicates that the probability of measuring the presence of the photon in any one of the four basis waveguides, represented as lines 510 and 530 in QIP circuit 500, is equivalent to the squared magnitude of the probability amplitudes. Since each probability amplitude is $1/\sqrt{4}$, the probability of measuring the presence of the photon in any one of the four basis waveguides is ¼.

A QIP circuit element characterized by a $C_4$ transformation matrix can be employed to evolve a qudit, initially in a basis state, into a state of perfect superposition wherein the squared magnitude of each component in the qudit state vector has the same value. As an example, consider that qudit 510 is initialized as $|\Psi_4\rangle=|0\rangle$ in QIP circuit 500a. When the qudit 510 undergoes a quantum state evolution due to the $C_4$ gate 520, it evolves into a state of perfect superposition represented by line 530 as $$|\Psi_4\rangle = C_4|0\rangle = \frac{|0\rangle + |1\rangle + |2\rangle + |3\rangle}{\sqrt{4}}.$$

One example of a QIP circuit element with a characteristic transformation matrix $C_4$ is described in [SL+:18a]. This device was originally conceived as a four-port coupler for application in an optical circuit operating classically [MT+:

04]. The original application for the device was to serve as an element to support an optical lattice filter in a photonics integrated circuit (PIC) and was later determined to function as a radix-4 Chrestenson gate when operating in the quantum photonic realm. Examples were fabricated to operate over free-space channels as well as waveguide channels in an integrated circuit.

Figure 5B:
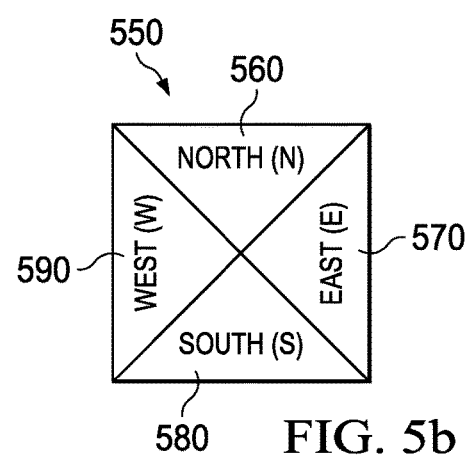
FIG. 5b illustrates, in the form of a diagram of a quantum photonic embodiment of a radix-4 single qudit operator referred to as the Chrestenson gate and denoted as $C_4$ that utilizes the position observable of a photonic host particle as the information carrying attribute when used in a QIP circuit.

The geometry of one example of such a QIP circuit element is depicted in FIG. 5b as element 550 depicting bidirectional ports 560, 570, 580, and 590, on each side or face of the element 550 that are annotated as "North (N)," 560 "East (E)," 570 "South (S)," 580 and "West (W)" 590 respectively. When this example element 550 is utilized as element 520 in a QPIC, waveguides are coupled to the bidirectional ports 560, 570, 580, and 590. For example, this group of four waveguides may serve as lines 510 and 530 as depicted in FIG. 5a, wherein the incident photon to 520 whose state is represented by line 510 corresponds to waveguides to bidirectional ports 560, 570, 580, and 590. Likewise, the photon emerging from the element 550 after the undergoing the $C_4$ operation propagates away from element 550 along the same group of four waveguides 560, 570, 580, and 590 to bidirectional ports 560, 570, 580, and 590 (e.g., as represented in the QIP circuit 500 with line 530). In other words, a single photon may be on a single waveguide to a single port 560, 570, 580, and 590 may be superimposed on all waveguides to all ports 560, 570, 580, and 590. The reflection of the photon can then be emitted from the element 550 on those waveguides from ports 560, 570, 580, and 590. Thus a radix-4 Chrestenson gate, $C_4$ (e.g., which can be implemented using QIP circuit element 550) can be utilized to implement a single radix-4 qudit operation.

As discussed above, in many cases, QIP may require the use of controlled operations, that may in turn rely on the entanglement or interaction of qudits. However, in many instances these controlled operations may function to actually entangle such qudits (or otherwise rely on the interaction of such qudits) only a fraction of the time (e.g., 25% or the like). Such failures may result, for example, at least partially from the information carrier used for such qudits. For example, when photons are utilized as the information carriers, it may be extremely difficult to get photons to interact. Thus, in operations where such entanglement fails (e.g., 75% of the time) the entire quantum operation may fail. QIP circuits that manifest such high rates of failure are described in "A Scheme for Efficient Quantum Computation with Linear Optics" by Knill et al in Nature Vol. 409, Jan. 4, 2001 and "Realization of a Knill-Laflamme-Milburn C-NOT gate—a photonic quantum circuit combining effective optical nonlinearities," by Okamoto et al [arXiv: 1006.4743v1], Jun. 24, 2010, which are both hereby incorporated by reference herein in their entirety. Such high rates of failure (both of the entanglement operation and the resulting failure of the quantum circuit generally) serve as a massive impediment to efficient QIP. Thus, there is significant motivation to realize such controlled qudit operations that have higher rates of success, including the entanglement of qudits and the controlled qudit operations that depend on such entanglement operations.

To address those desires, among other ends, embodiments as disclosed herein may provide a radix-2 quantum operation utilizing a trans-radix quantum circuit comprising one or more radix-r circuit elements where r>2. Embodiments of such a quantum circuit may also include one more radix-2 circuit elements, wherein the input or output ports of the one or more radix-r quantum circuit elements are utilized to support the input and output of radix-2 qubit transmission channels.

Specifically, embodiments may utilize a radix-4 Chrestenson gate, $C_4$ in a trans-radix fashion. For example, embodiments may utilize two qudits (e.g., photons) with the Chrestenson gate, $C_4$. Each qudit (e.g., photon) may be present at only two associated ports of the Chrestenson gate, $C_4$. In particular, a first qudit may be provided at an associated waveguide of a first or second port of the Chrestenson gate, $C_4$, such that the first qudit is in a basis state on the waveguide of the first port or on the waveguide of the second port or, the first qudit is superimposed on both the waveguide of the first port and the waveguide of the second port. Similarly, a second qudit may be provided at an associated third and fourth port of the Chrestenson gate, $C_4$ such that the second qudit is in a basis state on the waveguide of the third port or on the waveguide of the fourth port or, the second qudit is superimposed on both the waveguide of the first port and the waveguide of the second port. It may be desirable in many embodiments that this presentation of the first and second qudits at their respective ports be time aligned.

Accordingly, based on the interaction of the first and second qudit in the radix-4 Chrestenson gate, $C_4$ the first qudit may emerge in a basis state on the waveguide of the first port or the waveguide of the second port, or superimposed on both waveguides from both the first and second ports of the Chrestenson gate, $C_4$, while the second qudit may emerge in a basis state on the waveguide from the third port or the waveguide of the fourth port, or superimposed on both waveguides from both the third and fourth ports of the Chrestenson gate, $C_4$. Embodiments of such a trans-radix Chrestenson gate, $C_4$ in may have up to a 100% success rate in achieving interaction (e.g. entanglement) of the qudits utilized with such a trans-radix Chrestenson gate.

Figure 6:
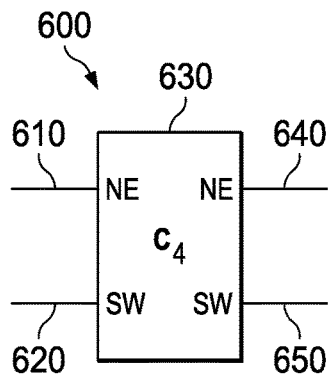
FIG. 6 illustrates, in QIP circuit form, one embodiment of a trans-radix operation wherein two radix-2 qubits are applied to the single radix-4 Chrestenson gate, $C_4$.

Referring then to FIG. 6, one embodiment of a radix-4 Chrestenson gate, $C_4$, that is adapted to operate in a trans-radix fashion is depicted in QIP circuit 600. The horizontal lines 610, 620, 640, and 650 represent radix-2 qubits whereas the $C_4$ gate 630 is a radix-4 single qudit operator (e.g., and is annotated accordingly "$C_4$"). Certain physical implementations of the $C_4$ operator in QIP systems permit the input to the $C_4$ operator to be physically separated into its computational basis components such as the quantum photonic implementation described with respect to FIG. 5b wherein the position observable serves as the information carrying attribute. In an analogous manner, a photonic qubit employed with a position observable would utilize two waveguides representing basis states $\{|0\rangle, |1\rangle\}$ in an implementation known as a "dual-rail" configuration within a QIP system. When the four waveguides supporting the radix-4 qudit and representing basis states $\{|0\rangle, |1\rangle, |2\rangle, |3\rangle\}$ are partitioned into two sets of two waveguides, then a trans-radix configuration can be achieved where the first two waveguides serve as the medium for a first qubit and the second set of waveguides serve as the medium for the second qubit.

While many physical implementations may be utilized as a Chrestenson gate, $C_4$ 630 in a trans-radix operation of such a gate, in one embodiment a $C_4$ circuit operating in a trans-radix mode may utilize the physical implementation of element 550 as depicted in FIG. 5b as Chrestenson gate, $C_4$ 630. In such an embodiment, the waveguides coupled to the ports annotated as "North (N)" and "East (E)," illustrated in FIG. 5b as 560 and 570 serve as the two basis waveguides for a first qubit, denoted as topmost qubit 610 and 640, on the Chrestenson gate, $C_4$ 630 (referred to conjointly as "NE"). Likewise, the bottommost qubit, 620 and 650, is transmitted in two waveguides coupled to the element 550 through waveguides 580 and 590 at locations "South (S)" and "West (W)" on the Chrestenson gate, $C_4$ 630 (referred to conjointly as "SW").

In other words, according to one embodiment one qubit 610 may be provided at an associated waveguide of a first port (e.g., 560, North) or second port (e.g., 570, East) of the Chrestenson gate, $C_4$ (e.g., 550), such that the first qudit is in a basis state on the waveguide of the first port (e.g., 560, North) or on the waveguide of the second port (e.g., 570, East) or, the first qudit is superimposed on both the waveguide of the first port and the waveguide of the second port (e.g., both 560, North and 570, East). Similarly, a second qudit may be provided at an associated third port (e.g., 580, South) and fourth port (e.g., 590, West) of the Chrestenson gate, $C_4$ (e.g., 550) such that the second qudit is in a basis state on the waveguide of the third port (e.g., 580, South) or on the waveguide of the fourth port (e.g., 590, West) or, the second qudit is superimposed on both the waveguide of the first port and the waveguide of the second port (e.g., both 580, South and 590, West). Again, It may be desirable in many embodiments that this presentation of the first and second qudits at their respective ports be time aligned.

When the $C_4$ gate 630 is used as a trans-radix operator with two qubits (e.g., instead of a single qudit), it functions as a two-qubit operator. Each pair of waveguides (e.g., the first pair being North and East (NE) and the second pair being South and West (SW)) serving as a medium for the two qubits represents the binary bases, $\{|0\rangle, |1\rangle\}$. The overall quantum state of the trans-radix QIP circuit 600 before the $C_4$ operator 630 is applied to the pair of qubits 610 and 620 is calculated as the tensor product of the qubits. As an example, consider the topmost qubit 610 to have an initial state represented as $|\Psi_2\rangle$ and the lowermost qubit 620 represented as $|\Phi_2\rangle$ where $|\Psi_2\rangle = a_0|0\rangle + a_1|1\rangle$, and $|\Phi_2\rangle = b_0|0\rangle + b_1|1\rangle$.

Then, the overall state is calculated as the tensor product, $|\Psi_2\rangle \otimes |\Phi_2\rangle = |\Psi_2 \Phi_2\rangle$, resulting in $|\Psi_2\rangle \otimes |\Psi_2\rangle = a_0 b_0 |00_2\rangle + a_0 b_1 |01_2\rangle + a_1 b_0 |10_2\rangle + a_1 b_1 |11_2\rangle$.

Note that the basis vector values utilize a subscript "2" to indicate they are radix-2 or binary values and not decimal values.

With the composite state of qubits 610 and 620 being described in this general form, the $C_4$ operator 630 can be applied resulting in the evolved state of the pair of qubits 640 and 650 as:

$$C_4|\Psi_2 \Phi_2\rangle = \frac{1}{\sqrt{4}} \begin{bmatrix} a_0 b_0 + a_0 b_1 + a_1 b_0 + a_1 b_1 \\ a_0 b_0 + i a_0 b_1 - a_1 b_0 - i a_1 b_1 \\ a_0 b_0 - a_0 b_1 + a_1 b_0 - a_1 b_1 \\ a_0 b_0 - i a_0 b_1 - a_1 b_0 + i a_1 b_1 \end{bmatrix}.$$

When the two qubits 610 and 620 are initialized in all possible combinations of computational basis states, $|\Psi_2 \Phi_2\rangle = \{|00\rangle, |01\rangle, |10\rangle, |11\rangle\}$, four different evolutions occur in qubits 640 and 650 when the $C_4$ operator 630 is applied as $$C_4|00_2\rangle = \frac{1}{\sqrt{4}} \begin{bmatrix} 1 \\ 1 \\ 1 \\ 1 \end{bmatrix} = \frac{|00_2\rangle + |01_2\rangle + |10_2\rangle + |11_2\rangle}{\sqrt{4}},$$

$$C_4|01_2\rangle = \frac{1}{\sqrt{4}} \begin{bmatrix} 1 \\ i \\ -1 \\ -i \end{bmatrix} = \frac{|00_2\rangle + i|01_2\rangle - |10_2\rangle - i|11_2\rangle}{\sqrt{4}},$$

$$C_4|10_2\rangle = \frac{1}{\sqrt{4}} \begin{bmatrix} 1 \\ -1 \\ 1 \\ -1 \end{bmatrix} = \frac{|00_2\rangle - |01_2\rangle + |10_2\rangle - |11_2\rangle}{\sqrt{4}}, \text{ and}$$

$$C_4|11_2\rangle = \frac{1}{\sqrt{4}} \begin{bmatrix} 1 \\ -i \\ -1 \\ i \end{bmatrix} = \frac{|00_2\rangle - i|01_2\rangle - |10_2\rangle + i|11_2\rangle}{\sqrt{4}}.$$

These calculations indicate that $C_4$ operator 630 operates to generate a perfect radix-4 superposition of a composite state formed with a pair of radix-2 qubits $|\Psi_2 \Phi_2\rangle$ 640 and 650 when the two radix-2 qubits 610 and 620 are initialized to one of their respective composite basis states. In general, the trans-radix operation of a higher radix QIP circuit enables the use of lower radix information carrying qudits whose composite state represents an overall quantum state of the said higher radix.

As may be understood, embodiments of such a trans-radix Chrestenson gate, $C_4$ (e.g., embodiments utilizing QIP circuit element 550 in a trans-radix configuration) may have up to a 100% success rate in achieving interaction (e.g. entanglement) of the two qudits utilized with such a trans-radix Chrestenson gate. Accordingly, because such a trans-radix Chrestenson gate $C_4$ may be utilized as a type of controlled quantum circuit based on at least two qudits, such a trans-radix Chrestenson gate $C_4$ can be usefully employed in embodiments of other (e.g., standard) controlled quantum circuits. For example, embodiments of a trans-radix Chrestenson gate $C_4$ gate may be used to implement embodiments of a reliable controlled-S gate quantum circuit, embodiments of a reliable controlled-Z quantum circuit, embodiments of a reliable controlled-X quantum circuit, or more generally to implement reliable embodiments of quantum circuits where entanglement or interaction of qubits is desired.

Moreover, as will be understood, a controlled-S gate (e.g., or a controlled-X gate) may be a subset of all possible quantum operations in the binary domain. Accordingly, almost any quantum circuit desired may be constructed in a reliable fashion using embodiments of a trans-radix Chrestenson gate, $C_4$, embodiments of the controlled-S gate, embodiments of the controlled-S gate or controlled-X gate as disclosed herein. Thus, embodiments herein may serve as a foundational change to the reliability of quantum circuits and quantum computing more generally.

Discussing first embodiments of a controlled-S gate that utilizes a trans-radix Chrestenson gate, $C_4$ it will be recalled from the above discussion with respect to FIG. 4 that a controlled-S gate (e.g., a single qubit phase operator S)

causes a 90 degree relative phase shift to occur between the computational basis components of the target qubit when a control qubit satisfies the activation basis criteria. Such a controlled-S gate may be reliably implemented using a trans-radix Chrestenson gate, $C_4$.

Figure 7A:
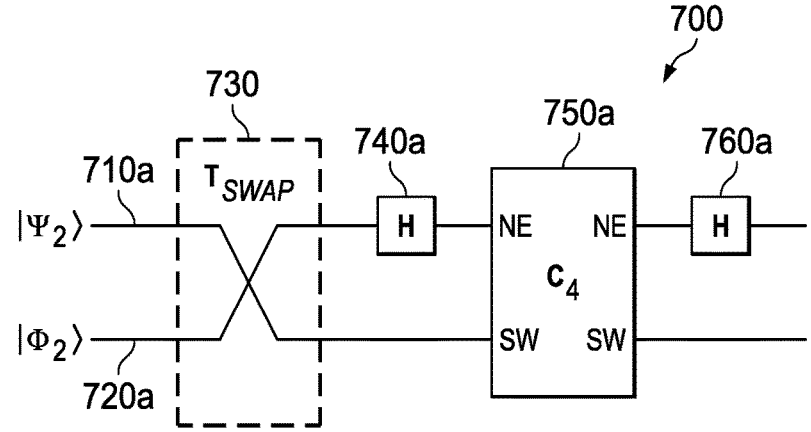
FIGS. 7a and 7b illustrate, in QIP circuit form, embodiments of a trans-radix operator wherein two radix-2 qubits are applied to a QIP system comprising radix-2 and a radix-4 Chrestenson gate, $C_4$, resulting in an overall action equivalent to a two-qubit radix-2 controlled qubit operator

Looking then as FIG. 7a, one embodiment of a trans-radix QIP circuit 700 for implementing a controlled-S gate is depicted. Quantum circuit 700 operates on two radix-2 qubits at the input represented as lines 710a and 720a and denoted as $|\Psi_2\rangle$ and $|\Phi_2\rangle$ respectively. In addition, QIP circuit 700 comprises an interchange or swap operation (e.g., element) 730 depicted as an interchange of the lines 710a and 720a. Swapping operation 730 may not be required in a physical implementation since it symbolically represents a renaming operation, however it is included in the QIP circuit diagram 700 to preserve the mathematical modeling convention of utilizing the topmost qubit as the leftmost operand when the non-commutative tensor product is calculated during a mathematical analysis of a QIP circuit.

QIP circuit 700 also comprises a radix-2 Hadamard gate 740a annotated as H, a trans-radix Chrestenson gate $C_4$ 750a annotated as $C_4$ (e.g., a Chrestenson gate $C_4$ operating as a trans-radix Chrestenson gate as discussed), and another radix-2 Hadamard gate 760a annotated as H.

Here, after passing through $T_{SWAP}$ 730, radix-2 qubit $|\Psi_2\rangle$ on line 710a may be provided to two ports of the trans-radix Chrestenson gate $C_4$ 750a (e.g., the South (S) port and the West (W) ports of the trans-radix Chrestenson gate $C_4$ 750). Radix-2 qubit $|\Phi_2\rangle$ on line 720a, after passing through $T_{SWAP}$ 730, is provided to Hadamard gate 740a and from the Hadamard gate 740a to the other two ports of the trans-radix Chrestenson gate $C_4$ 750a (e.g., the North (N) port and the East (E) ports of the trans-radix Chrestenson gate $C_4$ 750a). The waveguides from these ports (e.g., the North (N) port and the East (E) ports of the trans-radix Chrestenson gate $C_4$ 750a) are provided to Hadamard gate 760a.

The overall transfer characteristic of QIP circuit 700 is denoted as $T_{CS}$ and can be calculated as the direct product of the operators in circuit 700 as $T_{CS} = (H_B \otimes I_2) C_4 (H_A \otimes I_2) T_{SWAP}$.

Where each term corresponds to the transfer characteristics of the $\{H_A, H_B, C_4\}$ gates and $T_{SWAP}$ represents the swapping operation 730 that may be actually physically implemented as simply a qubit renaming operation. As previously mentioned the Hadamard operators are binary basis instances of the radix-r Chrestenson operation with r=2. The $T_{SWAP}$ transfer matrix is $$T_{SWAP} = \begin{bmatrix} 1 & 0 & 0 & 0 \\ 0 & 0 & 1 & 0 \\ 0 & 1 & 0 & 0 \\ 0 & 0 & 0 & 1 \end{bmatrix}.$$

Thus, the overall transformation matrix, $T_{CS}$, of QIP circuit 700 can be explicitly computed as $$T_{CS} = (H \otimes I) C_4 (H \otimes I) T_{SWAP} = \begin{bmatrix} 1 & 0 & 0 & 0 \\ 0 & 1 & 0 & 0 \\ 0 & 0 & 1 & 0 \\ 0 & 0 & 0 & i \end{bmatrix}.$$

It is noted that the overall transfer matrix of the trans-radix QIP circuit 700 is identical to the overall transfer matrix describing the controlled-S QIP circuit 400. Since $T_{CS}=C_S$, it is apparent that trans-radix QIP circuit 700 is equivalent to QIP circuit 400 and realizes a two qubit radix-2 controlled-S operator.

Figure 7B:
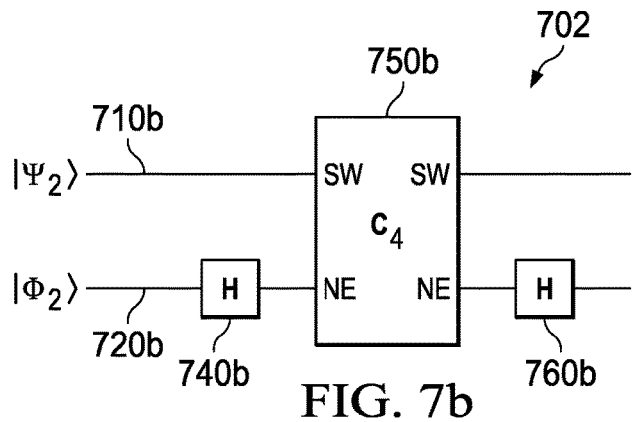

FIG. 7b depicts another embodiment of a trans-radix QIP circuit 702 for implementing a controlled-S gate. Quantum circuit 702 operates on two radix-2 qubits at the input represented as lines 710b and 720b and denoted as $|\Psi_2\rangle$ and $|\Phi_2\rangle$ respectively. QIP circuit 702 also comprises a radix-2 Hadamard gate 740b annotated as H, a trans-radix Chrestenson gate $C_4$ 750b annotated as $C_4$ (e.g., a Chrestenson gate $C_4$ operating as a trans-radix Chrestenson gate as discussed), and another radix-2 Hadamard gate 760b annotated as H.

Here, radix-2 qubit $|\Psi_2\rangle$ on line 710b may be provided to two ports of the trans-radix Chrestenson gate $C_4$ 750b (e.g., the South (S) port and the West (W) ports of the trans-radix Chrestenson gate $C_4$ 750b). Radix-2 qubit $|\Phi_2\rangle$ on line 720b is provided to Hadamard gate 740b and from the Hadamard gate 740b to the other two ports of the trans-radix Chrestenson gate $C_4$ 750b (e.g., the North (N) port and the East (E) ports of the trans-radix Chrestenson gate $C_4$ 750b). The waveguides from these ports (e.g., the North (N) port and the East (E) ports of the trans-radix Chrestenson gate $C_4$ 750b) are provided to Hadamard gate 760b.

Thus, the overall transformation matrix, $T_{CS}$, of QIP circuit 702 can be explicitly computed as $$T_{CS} = (H \otimes I) C_4 (H \otimes I) T_{SWAP} = \begin{bmatrix} 1 & 0 & 0 & 0 \\ 0 & 1 & 0 & 0 \\ 0 & 0 & 1 & 0 \\ 0 & 0 & 0 & i \end{bmatrix}.$$

Again is noted that the overall transfer matrix of the trans-radix QIP circuit 702 is identical to the overall transfer matrix describing the controlled-S QIP circuit 400. Since $T_{CS}=C_S$, it is apparent that trans-radix QIP circuit 702 is equivalent to QIP circuit 400 and realizes a two qubit radix-2 controlled-S operator.

Figure 8A:
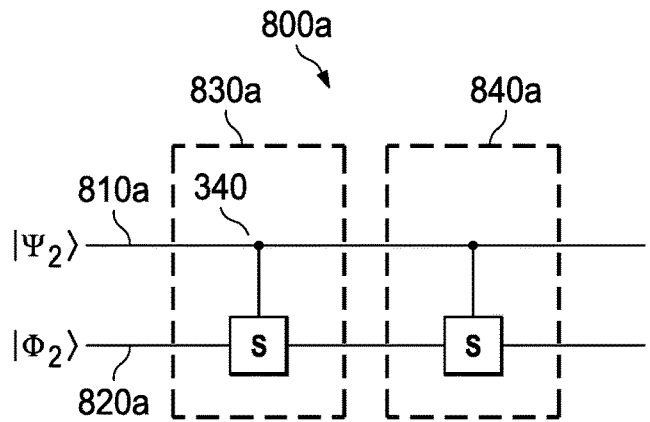
FIG. 8a illustrates, in QIP circuit form, a prior art implementation of a radix-2 controlled-Z circuit comprised of two radix-2 controlled-S circuits in series.
Figure 8B:
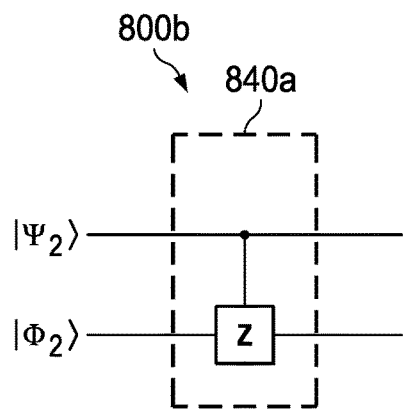
FIG. 8b illustrates, in QIP circuit form, a prior art representation of a radix-2 controlled-Z circuit.

As is known in the art, utilizing a controlled-S operator, a number of other controlled qubit operators may be constructed. For example, FIG. 8a depicts a high level diagram of a prior art QIP circuit 800a comprised of two radix-2 qubits at the input represented as lines 810a and 820a and denoted as $|\Psi_2\rangle$ and $|\Phi_2\rangle$ respectively. In addition, QIP circuit 800a is comprised of two controlled-S gates labeled 830a and 840a. The overall transfer matrix for QIP circuit 800a is equivalent to that of a single radix-2 controlled-Z QIP circuit depicted as circuit 800b in FIG. 8b with characteristic transformation matrix $C_Z$. The transformation matrix, $C_Z$, characterizing the radix-2 QIP controlled-Z circuit 800b is $$C_Z = \begin{bmatrix} 1 & 0 & 0 & 0 \\ 0 & 1 & 0 & 0 \\ 0 & 0 & 1 & 0 \\ 0 & 0 & 0 & -1 \end{bmatrix}.$$

The overall transformation matrix for QIP circuit 800a is shown to be equivalent to the radix-2 controlled-Z transformation matrix, $$\begin{bmatrix} 1 & 0 & 0 & 0 \\ 0 & 1 & 0 & 0 \\ 0 & 0 & 1 & 0 \\ 0 & 0 & 0 & i \end{bmatrix} \begin{bmatrix} 1 & 0 & 0 & 0 \\ 0 & 1 & 0 & 0 \\ 0 & 0 & 1 & 0 \\ 0 & 0 & 0 & i \end{bmatrix} = \begin{bmatrix} 1 & 0 & 0 & 0 \\ 0 & 1 & 0 & 0 \\ 0 & 0 & 1 & 0 \\ 0 & 0 & 0 & -1 \end{bmatrix} = C_Z.$$

Since the overall transformation matrix for QIP circuit 800a is equivalent to $C_Z$, it is apparent that the radix-2 QIP circuit 800a is equivalent to QIP circuit 800b and realizes the two qubit radix-2 controlled-Z operator.

Figure 9A:
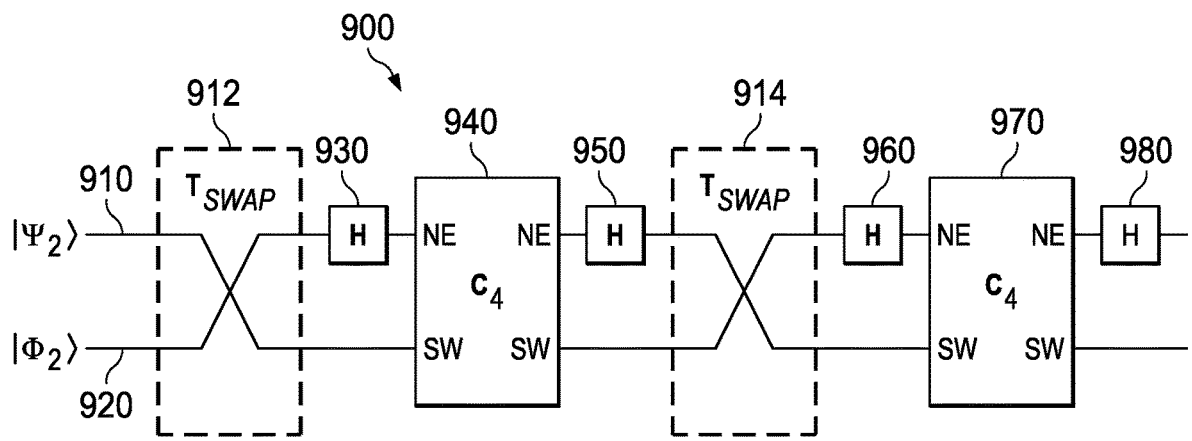
FIGS. 9a and 9b illustrates in QIP circuit form, embodiments of a trans-radix operator wherein two radix-2 qubits are applied to a QIP system comprising four radix-2 and two radix-4 Chrestenson gates, $C_4$, resulting in an overall action equivalent to a two-qubit radix-2 controlled-Z qubit operator with an equivalent specific target qubit transformation matrix Z resulting in an overall transformation matrix denoted as $C_Z$.

In other words, a controlled-Z operator may be obtained by chaining two controlled-S operators. Accordingly, embodiments herein may achieve reliable controlled-Z quantum circuits using embodiments of a reliable controlled-S circuit. Reference is thus made to FIG. 9a which depicts an embodiment of a trans-radix quantum circuit 900 for implementing a controlled-Z operation. Trans-radix QIP circuit 900 is adapted to operate on two radix-2 qubits at the input represented as lines 910a and 920a and denoted as $|\Psi_2\rangle$ and $|\Phi_2\rangle$ respectively. In addition, QIP circuit 900 is comprised of four single radix-2 Hadamard gates, H, as indicated by boxes 930a, 950a, 960a, and 980a. QIP circuit 900 also comprises two radix-4 Chrestenson gates, $C_4$, operating in a trans-radix mode as indicated by boxes 940a and 970a.

Here, after passing through $T_{SWAP}$ 912, radix-2 qubit $|\Psi_2\rangle$ on line 910a may be provided to two ports of the trans-radix Chrestenson gate $C_4$ 940a (e.g., the South (S) port and the West (W) ports of the trans-radix Chrestenson gate $C_4$ 940a). Radix-2 qubit $|\Phi_2\rangle$ on line 920a, after passing through $T_{SWAP}$ 912, is provided to Hadamard gate 930a and from the Hadamard gate 930a to the other two ports of the trans-radix Chrestenson gate $C_4$ 940a (e.g., the North (N) port and the East (E) ports of the trans-radix Chrestenson gate $C_4$ 940a). The waveguides from these ports (e.g., the North (N) port and the East (E) ports of the trans-radix Chrestenson gate $C_4$ 940a) are provided to Hadamard gate 950a.

After passing through $T_{SWAP}$ 914, radix-2 qubit $|\Psi_2\rangle$ on line 910a may be provided to Hadamard gate 960a and from Hadamard gate 960a to two ports of the trans-radix Chrestenson gate $C_4$ 970a (e.g., the North (N) port and the East (E) ports of the trans-radix Chrestenson gate $C_4$ 970a). The waveguides from these ports (e.g., the North (N) port and the East (E) ports of the trans-radix Chrestenson gate $C_4$ 970a) are provided to Hadamard gate 980a. Similarly, radix-2 qubit $|\Phi_2\rangle$ on line 920a, after passing through $T_{SWAP}$ 914, may be provided to the other two ports of the trans-radix Chrestenson gate $C_4$ 970a (e.g., the South (S) port and the West (W) ports of the trans-radix Chrestenson gate $C_4$ 970a).

The overall evolution of qubits on line 910a and 920a due to their propagation through trans-radix QIP circuit 900 is equivalent to the radix-2 controlled-Z gate 800b with characteristic matrix $C_Z$ as verified by calculating the overall transformation matrix $T_{CZ}$. It is noted that the embodiment of QIP circuit 900 comprises two instances of an embodiment of QIP circuit 700 in cascade, thus $T_{CZ} = T_{CS} T_{CS}$ and is calculated as $$T_{CZ} = T_{CS} T_{CS} = \begin{bmatrix} 1 & 0 & 0 & 0 \\ 0 & 1 & 0 & 0 \\ 0 & 0 & 1 & 0 \\ 0 & 0 & 0 & -1 \end{bmatrix}.$$

Since $T_{CZ} = C_Z$, it will be apparent that the embodiment of the trans-radix QIP circuit 900 is equivalent to QIP circuit 800b and realizes the radix-2 controlled-Z operator.

Figure 9B:
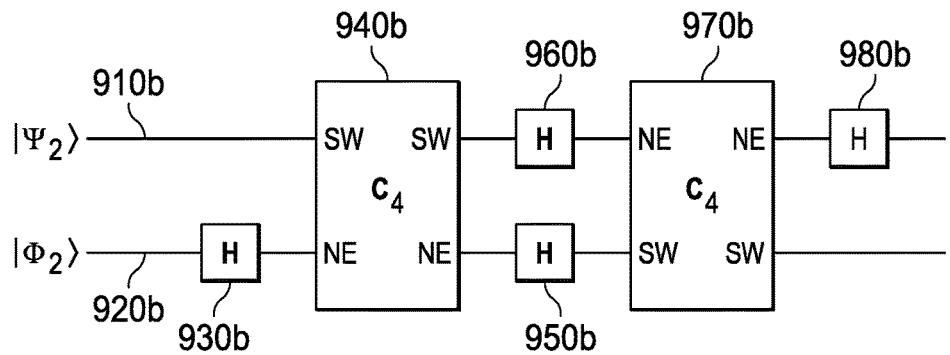

FIG. 9b depicts another embodiment of a trans-radix QIP circuit 902 for implementing a controlled-z gate. Trans-radix QIP circuit 902 is adapted to operate on two radix-2 qubits at the input represented as lines 910b and 920b and denoted as $|\Psi_2\rangle$ and $|\Phi_2\rangle$ respectively. In addition, QIP circuit 902 is comprised of four single radix-2 Hadamard gates, H, as indicated by boxes 930b, 950b, 960b, and 980b. QIP circuit 902 also comprises two radix-4 Chrestenson gates, $C_4$, operating in a trans-radix mode as indicated by boxes 940b and 970b.

Here, radix-2 qubit $|\Psi_2\rangle$ on line 910b may be provided to two ports of the trans-radix Chrestenson gate $C_4$ 940b (e.g., the South (S) port and the West (W) ports of the trans-radix Chrestenson gate $C_4$ 940b). The waveguides from these ports (e.g., the South (S) port and the West (W) ports of the trans-radix Chrestenson gate $C_4$ 940b) are provided to Hadamard gate 960b. Radix-2 qubit $|\Psi_2\rangle$ on line 910b continues from Hadamard gate 960b to two ports of the trans-radix Chrestenson gate $C_4$ 970b (e.g., the North (N) port and the East (E) ports of the trans-radix Chrestenson gate $C_4$ 970b). The waveguides from these ports (e.g., the North (N) port and the East (E) ports of the trans-radix Chrestenson gate $C_4$ 970b) are provided to Hadamard gate 980b.

Radix-2 qubit $|\Phi_2\rangle$ on line 920b is provided to Hadamard gate 930b and from the Hadamard gate 930b to the other two ports of the trans-radix Chrestenson gate $C_4$ 940b (e.g., the North (N) port and the East (E) ports of the trans-radix Chrestenson gate $C_4$ 940a). The waveguides from these ports (e.g., the North (N) port and the East (E) ports of the trans-radix Chrestenson gate $C_4$ 940a) are provided to Hadamard gate 950b. Radix-2 qubit $|\Phi_2\rangle$ on line 920b continues from Hadamard gate 950b to two ports of the trans-radix Chrestenson gate $C_4$ 970b (e.g., the South (S) port and the West (W) ports of the trans-radix Chrestenson gate $C_4$ 970b).

The overall evolution of qubits on line 910b and 920b due to their propagation through trans-radix QIP circuit 902 is equivalent to the radix-2 controlled-Z gate 800b with characteristic matrix $C_Z$ as verified by calculating the overall transformation matrix $T_{CZ}$. It is noted that the embodiment of QIP circuit 902 comprises two instances of an embodiment of QIP circuit 702 in cascade, thus $T_{CZ} = T_{CS} T_{CS}$ and is calculated as $$T_{CZ} = T_{CS} T_{CS} = \begin{bmatrix} 1 & 0 & 0 & 0 \\ 0 & 1 & 0 & 0 \\ 0 & 0 & 1 & 0 \\ 0 & 0 & 0 & -1 \end{bmatrix}.$$

Since $T_{CZ} = C_Z$, it will be apparent that the embodiment of the trans-radix QIP circuit 902 is equivalent to QIP circuit 800b and realizes the radix-2 controlled-Z operator.

Figure 10A:
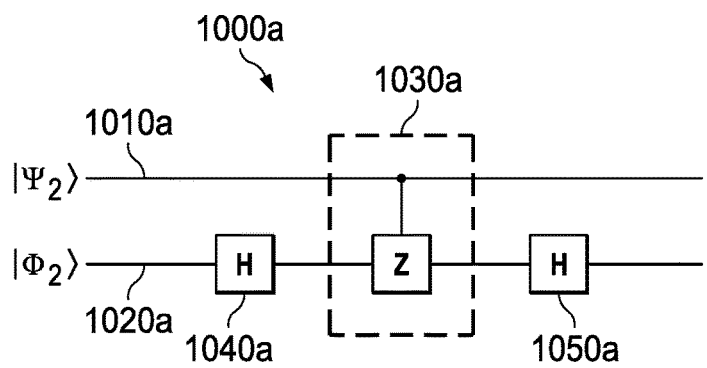
FIG. 10a illustrates, in QIP circuit form, a prior art implementation of a radix-2 controlled-X circuit comprised of two radix-2 single qubit Hadamard gates, H, and a controlled-Z gate.
Figure 10B:
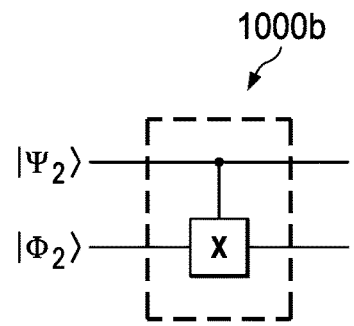
FIG. 10b illustrates, in QIP circuit form, a prior art representation of a radix-2 controlled-X circuit.

Again, as is known in the art, utilizing a controlled-S or controlled-Z operator, other controlled qubit operators may be constructed. For example, FIG. 10a depicts a prior art QIP circuit 1000a comprised of two radix-2 qubits at the input represented as lines 1010a and 1020a and denoted as $|\Psi_2\rangle$ and $|\Phi_2\rangle$ respectively. In addition, QIP circuit 1000a is comprised of single controlled-Z gate labeled 1030a and two single qubit radix-2 Hadamard gates 1040a and 1050a. The overall transfer matrix for QIP circuit 1000a is equivalent to that of a single radix-2 controlled-X QIP circuit depicted as circuit 1000b with characteristic transformation matrix $C_X$. The transformation matrix, $C_X$, characterizing the radix-2 QIP controlled-X circuit 1000b is $$C_X = \begin{bmatrix} 1 & 0 & 0 & 0 \\ 0 & 1 & 0 & 0 \\ 0 & 0 & 0 & 1 \\ 0 & 0 & 1 & 0 \end{bmatrix}.$$

The overall transformation matrix for QIP circuit 1000a is shown to be equivalent to the radix-2 controlled-X transformation matrix, $$(I \otimes H)C_Z(I \otimes H) = \begin{bmatrix} 1 & 0 & 0 & 0 \\ 0 & 1 & 0 & 0 \\ 0 & 0 & 0 & 1 \\ 0 & 0 & 1 & 0 \end{bmatrix} = C_X.$$

Since $T_{CX}=C_X$, it is apparent that the radix-2 QIP circuit 1000a is equivalent to QIP circuit 1000b and realizes the two qubit radix-2 controlled-X operator.

In other words, a controlled-X operator may be obtained utilizing a controlled-Z operator. Additionally, as discussed above, a controlled-X operator may be obtained using chained controlled-S operators. Accordingly, embodiments herein may achieve reliable controlled-X quantum circuits using embodiments of a reliable controlled-S or a reliable controlled-Z circuit as discussed.

Figure 11A:
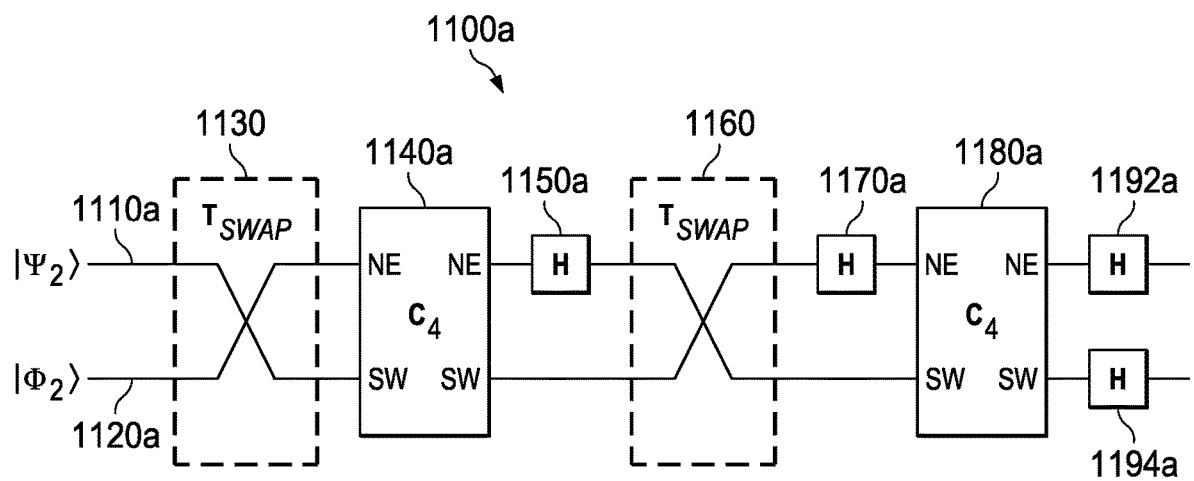
FIG. 11a illustrates, in QIP circuit form, one embodiment of a trans-radix operator wherein two radix-2 qubits are applied to a QIP system comprising four radix-2 Hadamard gates, H, and two radix-4 Chrestenson gates, $C_4$, resulting in an overall action equivalent to a two-qubit radix-2 controlled-X qubit QIP circuit.

Turning to FIG. 11a then, one embodiment a trans-radix QIP circuit 1100a comprised of two radix-2 qubits at the input represented as lines 1110a and 1120a and denoted as $|\Psi_2\rangle$ and $|\Phi_2\rangle$ respectively. In addition, QIP circuit 1100a is comprised of four single radix-2 Hadamard gates, H, as indicated by boxes 1150a, 1170a, 1192a, and 1194a. QIP circuit 1100a also comprises two radix-4 Chrestenson gates, $C_4$, operating in a trans-radix mode as indicated by boxes 1140a and 1180a. QIP circuit 1100a also comprises two swap operations, $T_{SWAP}$, 1140a and 1160a. The swap operations 1140a and 1160a are present simply for mathematical convenience in analyzing the overall QIP circuit transformation matrix, $T_{CX}$ and are not indicative of an actual physical implementation.

Here, after passing through $T_{SWAP}$ 1130, radix-2 qubit $|\Psi_2\rangle$ on line 1110a may be provided to two ports of the trans-radix Chrestenson gate $C_4$ 1140a (e.g., the South (S) port and the West (W) ports of the trans-radix Chrestenson gate $C_4$ 1140a). The waveguides from these ports (e.g., the South (S) port and the West (W) ports of the trans-radix Chrestenson gate $C_4$ 1140a) are provided through $T_{SWAP}$ 1160 to Hadamard gate 1170a and from Hadamard gate 1170a to two ports of the trans-radix Chrestenson gate $C_4$ 1180a (e.g., the North (N) port and the East (E) ports of the trans-radix Chrestenson gate $C_4$ 1180a). From these two ports (e.g., the North (N) port and the East (E) ports of the trans-radix Chrestenson gate $C_4$ 1180a) radix-2 qubit $|\Psi_2\rangle$ on line 1110a may be provided to Hadamard gate 1192a.

Radix-2 qubit $|\Phi_2\rangle$ on line 1120a, after passing through $T_{SWAP}$ 1130, is provided to the other two ports of the trans-radix Chrestenson gate $C_4$ 1140a (e.g., the North (N) port and the East (E) ports of the trans-radix Chrestenson gate $C_4$ 1140a). The waveguides from these ports (e.g., the North (N) port and the East (E) ports of the trans-radix Chrestenson gate $C_4$ 1140a) are provided to Hadamard gate 1150a and from Hadamard gate 1150a through $T_{SWAP}$ 1160 to two ports of the trans-radix Chrestenson gate $C_4$ 1180a (e.g., the South (S) port and the West (W) ports of the trans-radix Chrestenson gate $C_4$ 1180a). From these two ports (e.g., the South (S) port and the West (W) ports of the trans-radix Chrestenson gate $C_4$ 1180a) radix-2 qubit $|\Phi_2\rangle$ on line 1120a may be provided to Hadamard gate 1194a.

The overall evolution of qubits 1110a and 1120a due to their propagation through trans-radix QIP circuit 1100a is equivalent to the radix-2 controlled-X gate 1000b with characteristic matrix $C_X$ as verified by calculating the overall transformation matrix $T_{CX}$. The overall transformation matrix for trans-radix QIP circuit 1100a is $$T_{CX} = (H \otimes H)C_4(H \otimes I)T_{SWAP}(H \otimes I)C_4 T_{SWAP} = \begin{bmatrix} 1 & 0 & 0 & 0 \\ 0 & 1 & 0 & 0 \\ 0 & 0 & 0 & 1 \\ 0 & 0 & 1 & 0 \end{bmatrix}.$$

Since $T_{CX}=C_X$, it is apparent that trans-radix QIP circuit 1100a is equivalent to QIP circuit 1000b and realizes the radix-2 controlled-X operator.

Figure 11B:
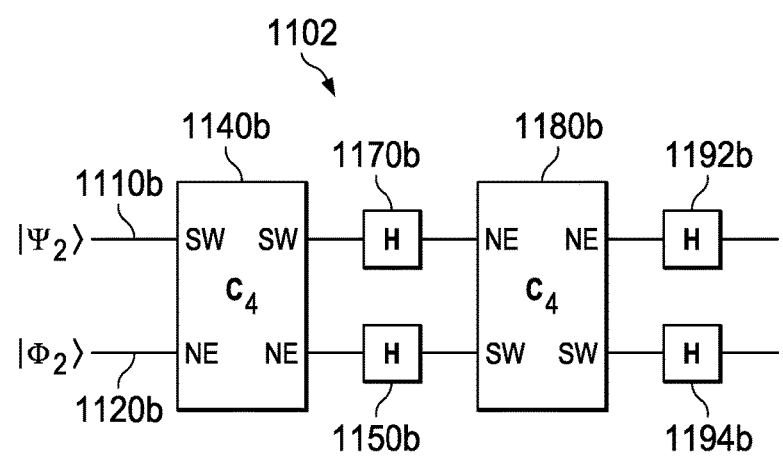
FIG. 11b illustrates, in QIP circuit form, one embodiment of a trans-radix operator wherein two radix-2 qubits are applied to a QIP system comprising four radix-2 Hadamard gates, H, and two radix-4 Chrestenson gates, $C_4$, resulting in an overall action equivalent to a two-qubit radix-2 controlled-X qubit QIP circuit.

FIG. 11b depicts an embodiment of a trans-radix QIP circuit 1102 comprised of two radix-2 qubits at the input represented as lines 1110b and 1120b and denoted as $|\Psi_2\rangle$ and $|\Phi_2\rangle$ respectively. In addition, QIP circuit 1100b is comprised of four single radix-2 Hadamard gates, H, as indicated by boxes 1150b, 1170b, 1192b, and 1194b. QIP circuit 1100b also comprises two radix-4 Chrestenson gates, $C_4$, operating in a trans-radix mode as indicated by boxes 1140b and 1180b. The trans-radix Chrestenson gate 1140b is shown with the ports denoted as "SW" at the topmost portion of the device (e.g., the South (S) port and the West (W) ports of the trans-radix Chrestenson gate $C_4$ 1140b) and those denoted as "NE" at the bottom (e.g., the North (N) port and the East (E) ports of the trans-radix Chrestenson gate $C_4$ 1140b).

In this embodiment, radix-2 qubit $|\Psi_2\rangle$ on line 1110b may be provided to two ports of the trans-radix Chrestenson gate $C_4$ 1140b (e.g., the South (S) port and the West (W) ports of the trans-radix Chrestenson gate $C_4$ 1140b). The waveguides from these ports (e.g., the South (S) port and the West (W) ports of the trans-radix Chrestenson gate $C_4$ 1140b) are provided to Hadamard gate 1170b and from Hadamard gate 1170b to two ports of the trans-radix Chrestenson gate $C_4$ 1180b (e.g., the North (N) port and the East (E) ports of the trans-radix Chrestenson gate $C_4$ 1180b). From these two ports (e.g., the North (N) port and the East (E) ports of the trans-radix Chrestenson gate $C_4$ 1180b) radix-2 qubit $|\Psi_2\rangle$ on line 1110b may be provided to Hadamard gate 1192b.

Radix-2 qubit $|\Phi_2\rangle$ on line 1120*b* is provided to the other two ports of the trans-radix Chrestenson gate $C_4$ 1140*b* (e.g., the North (N) port and the East (E) ports of the trans-radix Chrestenson gate $C_4$ 1140*b*). The waveguides from these ports (e.g., the North (N) port and the East (E) ports of the trans-radix Chrestenson gate $C_4$ 1140*b*) are provided to Hadamard gate 1150*b* and from Hadamard gate 1150*b* to two ports of the trans-radix Chrestenson gate $C_4$ 1180*b* (e.g., the South (S) port and the West (W) ports of the trans-radix Chrestenson gate $C_4$ 1180*b*). From these two ports (e.g., the South (S) port and the West (W) ports of the trans-radix Chrestenson gate $C_4$ 1180*b*) radix-2 qubit $|\Phi_2\rangle$ on line 1120*ab* may be provided to Hadamard gate 1194*b*.

The arrangement of circuit 1102 allows the swap operations of QIP circuit 1100 to be removed and thus causes QIP circuit 1102 to be structurally similar to QIP circuit 1100. The swaps shown in QIP circuit 1100 do not affect physical realization and are only included to remain consistent with the conventions of mathematical analysis that dictate the uppermost qubit in a QIP circuit diagram is the leftmost operator when calculating the tensor product. However, this mathematical convention does not affect physical implementations, thus the trans-radix QIP circuit 1102 also implements a radix-2 controlled-X operation, also known as a controlled-NOT gate.

Embodiments as described herein or otherwise may be understood with reference to the descriptions below. It should be understood that these descriptions describe particular embodiments and that any language used therein (e.g., "must", "should", "requires" etc.) is utilized only with respect to those embodiments and should not in any way be taken as placing any restrictions, requirements or limitations on other embodiments.

Generally then, the invention has been described with reference to specific embodiments. However, one of ordinary skill in the art appreciates that various modifications and changes can be made without departing from the scope of the invention. Accordingly, the description herein is to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Reference throughout this specification to "one embodiment," "an embodiment," or "a specific embodiment," "a specific implementation," or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description numerous specific details are provided, such as examples of components or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

REFERENCES

The following references may be useful to an understanding of embodiments depicted herein and are fully incorporated herein by reference in their entirety for all purposes.

[TS+:08] Thornton, M. A., Spenner, L., Matula, D. W., and Miller, D. M., "Quantum Logic Implementations for Unary Arithmetic Operations," in proc. $38^{nd}$ *IEEE Int. Symp. on Multiple-Valued Logic*, IEEE Computer press, pp. 202-207, 2008.

[ST:19] Smith, K. N. and Thornton, M. A., "Higher Dimension Quantum Entanglement Generators," *ACM Journal on Emerging Technologies in Computing Systems*, vol. 16, no. 1, article 3, pp. 3-1:3-21, October, 2019.

[Ch:55] Chrestenson, H. E. et al., "A Class of Generalized Walsh Functions," *Pacific Journal of Mathematics*, vol. 5, no. 1, pp. 17-31, 1955.

[Vi:47] Vilenkin, N. Y., "Concerning a Class of Complete Orthogonal Systems," *Dokl. Akad. Nauk SSSR, Ser. Math.*, Doklady Akademii Nauk SSSR, 1947.

[ZK:02] Zeljko, Z. and Katarzyna, R., "The Role of Superfast Transforms in Speeding Up Quantum Computations," in proc. $32^{nd}$ *IEEE Int. Symp. on Multiple-Valued Logic*, IEEE Computer press, pp. 129-135, 2002.

[SL+:18a] Smith, K. N., LaFave, T. P., MacFarlane, D. L., and Thornton, M. A., "A Radix-4 Chrestenson Gate for Optical Quantum Computation," in proc. 48th *IEEE Int. Symp. on Multiple-Valued Logic*, IEEE Computer press, pp. 260-265, 2002.

[SL+:18b] Smith, K. N., LaFave, T. P., MacFarlane, D. L., and Thornton, M. A., "Higher-radix Chrestenson Gates for Photonic Quantum Computation," *Journal of Applied Logics*, vol. 5, no. 9, pp. 1781-1798, 2002.

[MT+:04] MacFarlane, D. L., Tong, J., Fafida, C., Govindan, V., Hunt, L. R., and Panahi, I., "Extended Lattice Filters Enabled by Four-Directional Couplers," *Applied Optics*, vol. 43, no. 33, pp. 6124-6133, 2004.

What is claimed is:

1. A trans-radix quantum circuit, comprising:
a quantum circuit element implementing a Chrestenson transform matrix, wherein the quantum circuit element is adapted to operate as a trans-radix two qubit quantum circuit element, wherein the two qubits include a first radix-2 qubit and a second radix-2 qubit.

2. The trans-radix quantum circuit of claim 1, further comprising:
one or more radix-2 quantum circuit elements coupled to the quantum circuit element, wherein the trans-radix quantum circuit is adapted to operate as a controlled quantum circuit.

3. The trans-radix quantum circuit of claim 2, wherein the one or more radix-2 quantum circuit elements include a radix-2 quantum circuit element implementing a Hadamard transform matrix, and the trans-radix quantum circuit is adapted to operate as a radix-2 controlled-S quantum circuit element.

4. The trans-radix quantum circuit of claim 3, wherein the radix-2 quantum circuit element is applied to the first qubit before the first qubit is provided to the quantum circuit element adapted to operate as the trans-radix two qubit quantum circuit element.

5. The trans-radix quantum circuit of claim 4, wherein the radix-2 quantum circuit element is applied to the first qubit after the quantum circuit element adapted to operate as the trans-radix two qubit quantum circuit element is applied to the first qubit.

6. The trans-radix quantum circuit of claim 2, wherein the one or more radix-2 quantum circuit elements include a radix-2 quantum circuit element implementing a Hadamard transform matrix, and the trans-radix quantum circuit is adapted to operate as a radix-2 controlled-Z quantum circuit element.

7. The trans-radix quantum circuit of claim 6, wherein the radix-2 quantum circuit element is applied to the first qubit before the first qubit is provided to the quantum circuit element implementing the Chrestenson transform matrix adapted to operate as the trans-radix two qubit quantum circuit element for the first time.

8. The trans-radix quantum circuit of claim 7, wherein the radix-2 quantum circuit element is applied to the first qubit after the quantum circuit element adapted to operate as the trans-radix two qubit quantum circuit element is applied to the first qubit for the first time and before the quantum circuit element adapted to operate as the trans-radix two qubit quantum circuit element is applied to the first qubit for the second time.

9. The trans-radix quantum circuit of claim 8, wherein the radix-2 quantum circuit element is applied to the second qubit before the second qubit is provided to the quantum circuit element implementing the Chrestenson transform matrix adapted to operate as the trans-radix two qubit quantum circuit element for the second time.

10. The trans-radix quantum circuit of claim 9, wherein the radix-2 quantum circuit element is applied to the second qubit after the second qubit after the quantum circuit element adapted to operate as the trans-radix two qubit quantum circuit element is applied to the second qubit for the second time.

11. The trans-radix quantum circuit of claim 2, wherein the one more radix-2 quantum circuit elements include a radix-2 quantum circuit element implementing a Hadamard transform matrix, and the trans-radix quantum circuit is adapted to operate as a radix-2 controlled-X quantum circuit element.

12. The trans-radix quantum circuit of claim 11, wherein the radix-2 quantum circuit element is applied to the first qubit after the quantum circuit element adapted to operate as the trans-radix two qubit quantum circuit element is applied to the first qubit for the first time and before the quantum circuit element adapted to operate as the trans-radix two qubit quantum circuit element is applied to the first qubit for the second time and the radix-2 quantum circuit element is applied to the second qubit after the quantum circuit element adapted to operate as the trans-radix two qubit quantum circuit element is applied to the second qubit for the first time and before the quantum circuit element adapted to operate as the trans-radix two qubit quantum circuit element is applied to the second qubit for the second time.

13. The trans-radix quantum circuit of claim 12, wherein the radix-2 quantum circuit element is applied to the first qubit after the quantum circuit element adapted to operate as the trans-radix two qubit quantum circuit element is applied to the first qubit for the second time and the radix-2 quantum circuit element is applied to the second qubit after the quantum circuit element adapted to operate as the trans-radix two qubit quantum circuit element is applied to the second qubit for the second time.

14. The trans-radix quantum circuit of claim 1, wherein the quantum circuit element implementing the Chrestenson transform matrix is implemented in photonics.

15. The trans-radix quantum circuit of claim 14, wherein the quantum circuit element is an optical four-port directional coupler.

16. The trans-radix quantum circuit of claim 15, wherein applying the quantum circuit element to the first radix-2 qubit and the second radix-2 qubit, comprises providing the first radix-2 qubit to a first face or second face of the optical four-port directional coupler and the second radix-2 qubit to a third face or a fourth face of the optical four-port directional coupler.

17. A method, comprising
operating an optical four-port directional coupler as a trans-radix two-qubit QIP circuit element by:
providing a first radix-2 qubit at a first port or a second port of the optical four-port directional coupler; and
providing a second radix-2 qubit at a third port or a fourth port of the optical four-port directional coupler.

18. The method of claim 17, wherein the first radix-2 qubit and the second radix-2 qubit are time aligned at the first port, second port, third port or fourth port.

19. A trans-radix quantum circuit, comprising:
a quantum circuit element implementing a radix-2 quantum operation, the quantum circuit element comprising one or more radix-r circuit elements where r>2.

20. The trans-radix quantum circuit of claim 19, further comprising one more radix-2 circuit elements, wherein an input port or output port of the one or more radix-r quantum circuit elements support an input or output of a radix-2 qubit transmission channel.

* * * * *